United States Patent
Westphal et al.

(10) Patent No.: US 10,831,198 B2
(45) Date of Patent: Nov. 10, 2020

(54) PROCESS AND MACHINE FOR MAKING A RUNWAY EXTENSION SPEED FOR AN AIRCRAFT

(71) Applicant: The Boeing Company, Chicago, IL (US)

(72) Inventors: Jendrick Westphal, Hünstetten (DE); Jonas Schulze, Darmstadt (DE)

(73) Assignee: The Boeing Company, Chicago, IL (US)

( * ) Notice: Subject to any disclaimer, the term of this patent is extended or adjusted under 35 U.S.C. 154(b) by 629 days.

(21) Appl. No.: 15/680,968

(22) Filed: Aug. 18, 2017

(65) Prior Publication Data

US 2019/0056740 A1 Feb. 21, 2019

(51) Int. Cl.

| | | |
|---|---|---|
| *G05D 1/02* | (2020.01) | |
| *G05D 1/08* | (2006.01) | |
| *G05D 1/00* | (2006.01) | |
| *B64D 43/02* | (2006.01) | |
| *B64D 45/00* | (2006.01) | |

(Continued)

(52) U.S. Cl.
CPC ........... *G05D 1/0202* (2013.01); *B64D 43/00* (2013.01); *B64D 43/02* (2013.01); *B64D 45/00* (2013.01); *G05D 1/0055* (2013.01); *G05D 1/0083* (2013.01); *G05D 1/02* (2013.01);
(Continued)

(58) Field of Classification Search
CPC ...... G05D 1/0202; G05D 1/02; G05D 1/0083; G05D 1/0055; G05D 1/0808; G05D 1/0204; B64D 45/00; B64D 43/00; B64D 43/02; G08G 5/0065; G08G 5/0047
See application file for complete search history.

(56) References Cited

U.S. PATENT DOCUMENTS

| | | | |
|---|---|---|---|
| 7,139,645 B2 * | 11/2006 | Villaume | G05D 1/0083 701/16 |
| 9,082,301 B2 * | 7/2015 | Catalfamo | G08G 5/02 |

(Continued)

OTHER PUBLICATIONS

"Understanding V1, Once it's Reached, It's too Late to Abort", Aircraft Owners and Pilots Association, Feb. 1, 2011, copyright 2017, accessed Jul. 18, 2017, 7 pages. https://www.aopa.org/news-and-media/all-news/2011/february/01/understanding-v1.

(Continued)

*Primary Examiner* — Basil T. Jos
(74) *Attorney, Agent, or Firm* — Yee & Associates, P.C.

(57) ABSTRACT

Embodiments are disclosed for a machine and process that include a computer code specially programmed for creating a runway extension speed for an aircraft taking off. The process may include sensing current location, current acceleration, and current speed, for the aircraft during takeoff roll; receiving, in a ROTTOWIRE, the current speed and the current acceleration for the aircraft; creating in the ROTTOWIRE an actual speed profile; creating, using a specially coded program in the ROTTOWIRE and the current acceleration, the runway extension speed via determining, for a current location of the aircraft, a distance from a departure end of the runway and a terminating distance required to terminate the takeoff to a stop of the aircraft on the runway, a distance until the aircraft reaches a designated height; and when the terminating distance equals the distance from the departure end of the runway; and presenting the runway extension speed.

23 Claims, 11 Drawing Sheets

(51) Int. Cl.
*B64D 43/00* (2006.01)
*G08G 5/00* (2006.01)

(52) U.S. Cl.
CPC ......... *G05D 1/0808* (2013.01); *G08G 5/0047* (2013.01); *G08G 5/0065* (2013.01); *G05D 1/0204* (2013.01)

(56) References Cited

U.S. PATENT DOCUMENTS

| | | | |
|---|---|---|---|
| 9,164,505 B1 * | 10/2015 | Peck | B64C 25/426 |
| 10,202,204 B1 * | 2/2019 | Daidzic | B64C 5/02 |
| 10,315,777 B2 * | 6/2019 | Martins | B64D 45/00 |
| 2004/0260434 A1 * | 12/2004 | Zammit-Mangion | G05D 1/0083 701/15 |
| 2008/0215198 A1 * | 9/2008 | Richards | G08G 5/0021 701/15 |
| 2017/0158177 A1 | 6/2017 | Sharma | |
| 2017/0341772 A1 * | 11/2017 | Reis | B64D 43/00 |

OTHER PUBLICATIONS

FRAGA, The Boeing Company, Aero Magazine, Issue 47, Quarter 3, 2012, copyright 2012, 32 pages. http://www.boeing.com/commercial/aeromagazine/articles/2012_q3/pdfs/AERO_2012q3.pdf.

Clark et al., "Improving Runway Safety with Flight Deck Enhancements," The Boeing Company, Aero Magazine, Quarter 1, 2011, copyright 2011, pp. 4-11. http://www.boeing.com/commercial/aeromagazine/articles/2011_q1/pdfs/AERO_2011_Q1.pdf.

* cited by examiner

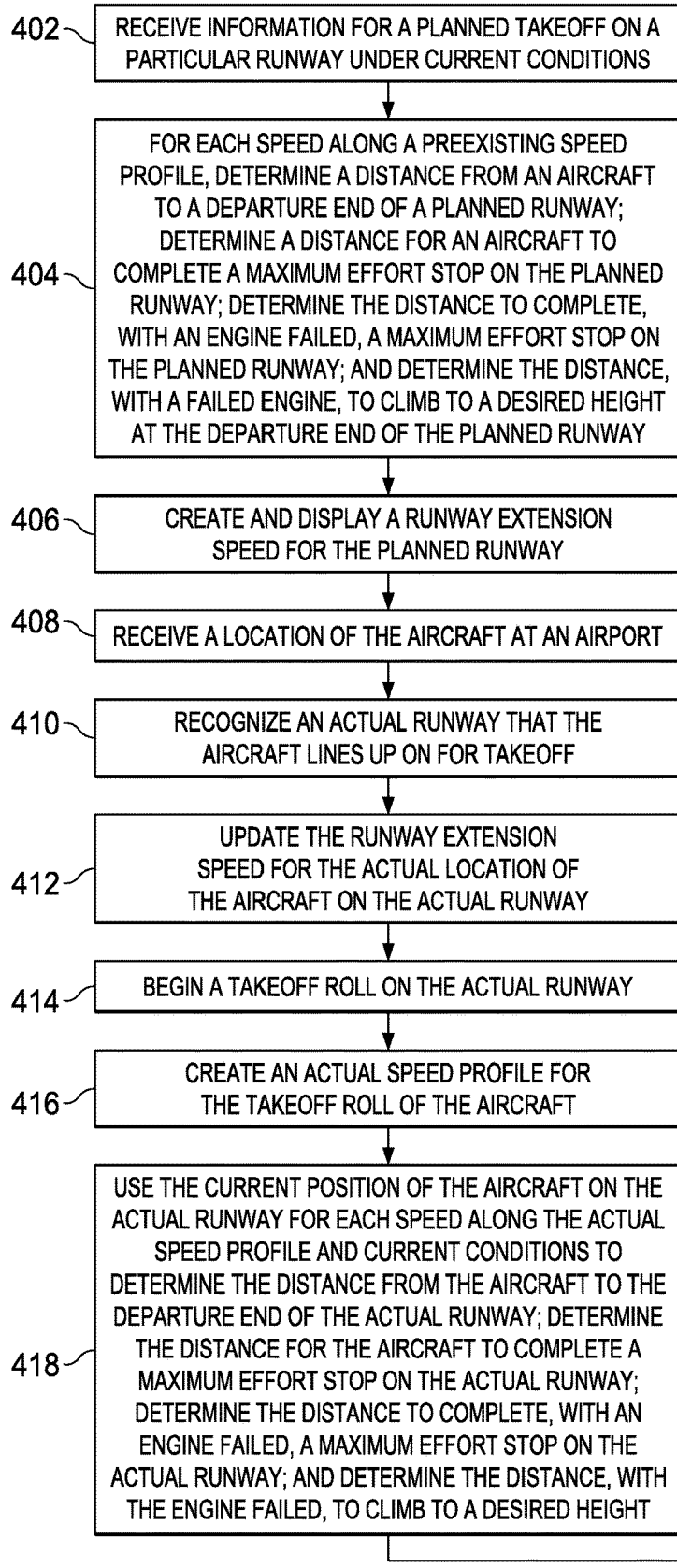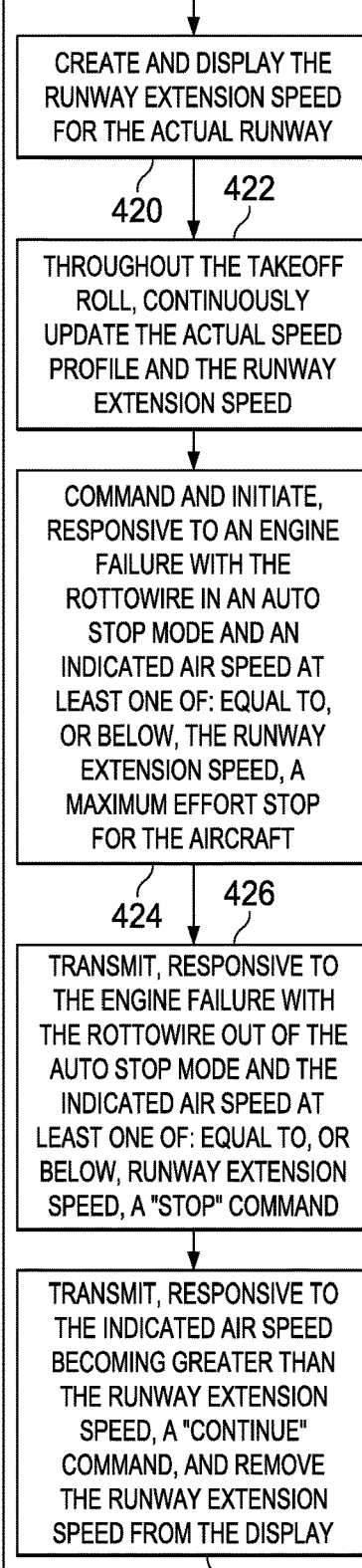
FIG. 4

PROCESS AND MACHINE FOR MAKING A RUNWAY EXTENSION SPEED FOR AN AIRCRAFT

BACKGROUND INFORMATION

1. Field

The present disclosure relates generally to takeoff considerations for an aircraft. More specifically, the present disclosure describes a process and a machine for dynamically presenting a speed, for a takeoff, that virtually extends the amount of runway available for an aircraft on takeoff roll.

2. Background

Various physical, governmental, and/or warranty reasons may limit an amount of thrust available to an aircraft for takeoff. Accordingly, under a particular set of conditions, a maximum weight and/or a minimum runway length may exist for an aircraft takeoff in a particular set of conditions.

Currently, requirements may exist for aircraft operators to derive, before beginning a takeoff, an action speed that will allow an aircraft, under some particular set of conditions to either continue the takeoff up into flight such that the aircraft will be above some height at a departure end of a takeoff runway or initiate an abort of the takeoff, such that the aircraft will remain on the takeoff runway after stopping the aircraft.

Currently, if an aircraft is at a maximum weight that required takeoff performance data calculations before takeoff based upon "book values" will allow for takeoff on a runway of a given length with set conditions and if an operator desires to increase the takeoff weight of the aircraft, the operator would need to increase takeoff thrust or move to a longer runway. Hence, an operator may desire to overcome the current limitations to a maximum weight or a minimum required runway length for an aircraft takeoff.

Therefore, it would be desirable to have a method and apparatus that take into account at least some of the issues and technical problems discussed above, as well as other possible issues. For example, it would be desirable at least to have a process and machine that provide the technical effects required to meet the requirements of regulations and certifications for aircraft takeoffs, but either increases an allowable takeoff weight (without increasing thrust produced during the takeoff—and effectively virtually extending the runway length), or decreases a required runway length for a given takeoff weight (without decreasing the takeoff weight—and effectively virtually increasing aircraft thrust for the takeoff).

SUMMARY

An embodiment of the present disclosure provides for a machine that comprises the embodiments that include a computer code specially programmed on a non-transitory medium to create a runway extension speed. The machine may be specially programmed and configured to sense: a current location, a current acceleration, and a current speed, for an aircraft during a takeoff roll of the aircraft. The machine may be specially programmed and configured to create, in a ROTTOWIRE (reduction of thrust/takeoff weight increase/runway extension), a preexisting speed profile. The machine may be specially programmed and configured to create in the ROTTOWIRE a constop boundary about the preexisting speed profile. The machine may be specially programmed and configured to receive, in the ROTTOWIRE, the current speed and the current acceleration for the aircraft. The machine may be specially programmed and configured to create in the ROTTOWIRE the actual speed profile.

Further, the machine may be specially programmed and configured to create, via a specially coded program in the ROTTOWIRE and the current acceleration, the runway extension speed based upon: a determination for the current location of the aircraft, a distance from a departure end of the runway, a terminating distance for the aircraft, and a distance until the aircraft reaches a designated height after lifting off the runway, and a determination of when the terminating distance equals the distance from the departure end of the runway. Additionally, the machine may be specially programmed and configured to present the runway extension speed.

Still further, the machine may include the computer code specially programmed to recognize a configuration and a condition of a system on the aircraft, and create the preexisting speed profile and the actual speed profile based upon the configuration and the condition of the system on the aircraft.

Another embodiment may illustrate a process for creating a runway extension speed for an aircraft taking off on a runway. The process may include: sensing a current location, a current acceleration, and a current speed, for the aircraft during a takeoff roll of the aircraft, receiving, in a ROTTOWIRE, the current speed and the current acceleration for the aircraft, and creating, in the ROTTOWIRE, an actual speed profile.

The process may further include creating, using a specially coded program in the ROTTOWIRE and the current acceleration, the runway extension speed via determining, for a current location of the aircraft, a distance from a departure end of the runway and a terminating distance required to terminate the takeoff to a stop of the aircraft on the runway, a distance until the aircraft reaches a designated height, and determining when the terminating distance equals the distance from the departure end of the runway. Additionally, the process may include presenting the runway extension speed.

Another embodiment of the present disclosure provides a process for reducing a thrust required for an aircraft taking off on a runway at a fixed gross weight. The process may include sensing a current location, a current thrust, a current acceleration, and a current speed for the aircraft, during a takeoff roll of the aircraft, receiving, in a ROTTOWIRE, the current speed and the current acceleration for the aircraft and creating, in the ROTTOWIRE, an actual speed profile.

The process may also include creating, using a specially coded program in the ROTTOWIRE and the current acceleration, the runway extension speed via determining, for a current location of the aircraft, a distance from a departure end of the runway, a terminating distance for the aircraft, and a distance until the aircraft reaches a designated height, and determining when the terminating distance equals the distance from the departure end of the runway. Additionally, the process may include presenting the runway extension speed.

The features and functions can be achieved independently in various embodiments of the present disclosure or may be combined in yet other embodiments in which further details can be seen with reference to the following description and drawings.

BRIEF DESCRIPTION OF THE DRAWINGS

Novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a high-level flowchart for actions driven by a logic, specially programmed into a ROTTOWIRE, depicted in accordance with a non-limiting illustrative embodiment;

DETAILED DESCRIPTION

Figure 1:
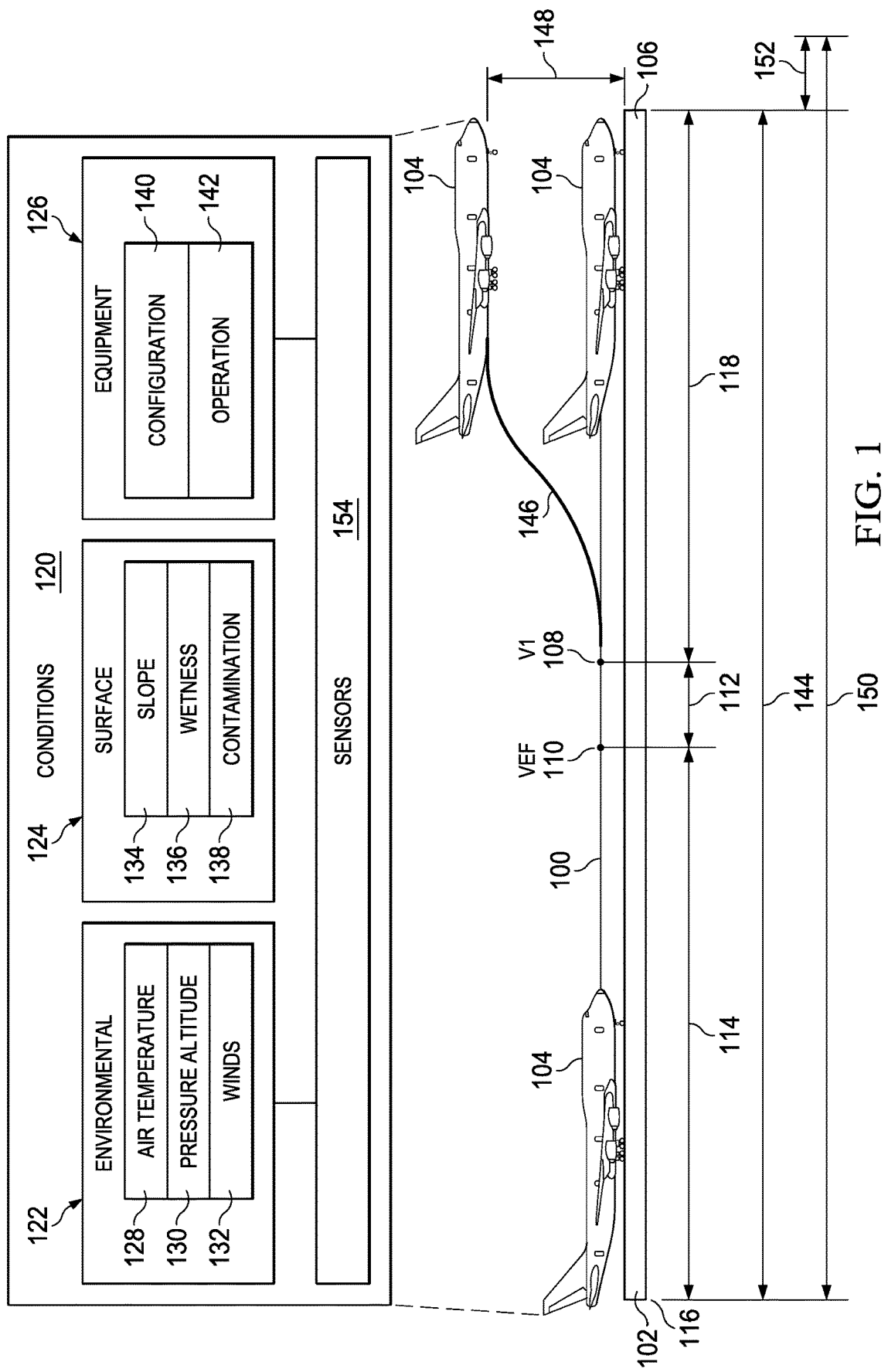
FIG. 1 is an illustration of a side view of a takeoff profile for an aircraft using a fixed action speed based upon pre-existing table values for an assumed aircraft and engine accelerations for an aircraft with a given thrust at a given takeoff weight and a particular set of conditions depicted in accordance with a non-limiting illustrative embodiment.

The illustrative embodiments recognize and take into account one or more different considerations. Without limitation, the conditions affecting derivation of that action speed may include a gross takeoff weight of the aircraft, a static air temperature, a thrust and/or power produced by the aircraft engines, a runway slope, a runway surface condition, a runway length, and a particular change in a status of the aircraft occurring prior to the action speed, such as, without limitation, a failure of a critical engine, a pilot reaction time from the failure of the critical engine until initiating the abort of the takeoff, and/or a margin and/or buffer of additional runway distance.

Additionally, the illustrative embodiments recognize and take into account that for any takeoff, the aircraft will travel some distance along and "use up" some amount of the runway length before accelerating to the action speed that was computed, before the aircraft begins its takeoff roll, for that takeoff. At the action speed some distance of the runway should remain in front of the aircraft. Requirements for aircraft operators and for airworthiness certification of an aircraft may be set by certifying and/or governmental agencies—such as, without limitation, the United States Federal Aviation Administration (FAA), the International Civil Aviation Organization (ICAO), and/or other governmental or regulatory agencies. Requirements may dictate that for an aircraft to be certified as airworthy, values must be determined and provided to an operator of an aircraft, of the speed at which an aircraft, of a given weight on a given runway under set conditions, may begin the first action of a maximum effort stop that allows the aircraft to terminate the takeoff on the remaining runway.

The illustrative embodiments also recognize and take into account that one of ordinary skill in the art understands that current derivations of that action speed are based upon an assumed acceleration for the engines on an aircraft to a specified level of thrust, and an assumed acceleration down the runway for the aircraft itself. These assumed accelerations may be based upon preexisting performance data provided for the engines and/or the aircraft by a manufacturer, which may be referred to as "book values."

However, one of ordinary skill in the art also understands that in an actual takeoff, when the aircraft reaches an action speed that has been determined before takeoff based upon book values, that derivations may exist between predicted lengths, for runway used to the action speed and runway remaining at the action speed, and actual lengths for runway used to the action speed and runway remaining at the action speed. The derivations may be dependent upon pilot technique and/or variations of conditions during the takeoff roll and/or variances in performance of each particular engine and each particular aircraft in a fleet, from a "book value" predicted for the performance for the aircraft. As a non-limiting example, all tires on the aircraft being at their minimum allowed inflation pressure versus being at their maximum allowed inflation pressure may reduce an acceleration of the aircraft, and therefore increases a distance the aircraft travels along the runway before reaching the action speed determined before takeoff based upon "book values."

Accordingly, a regulatory agency and/or prudence may dictate some added margins for each particular condition affecting the takeoff. As a non-limiting example of required margins, derivation of the action speed may allow only using some percentage of the actual runway length, or some percentage of the rated thrust for the aircraft taking off, may require some reduction of a climb gradient, or may extend a required runway distance by a distance traveled by the aircraft over some amount of a set time at a set speed, such as, without limitation, two seconds at the action speed. As one non-limiting example, see Federal Aviation Regulation 25.101.

If the added margin and/or margins are more than values are actually needed to account for differences between "book values" and actual performance of an aircraft (when actual performance exceeds predicted "book value" performance) in some particular set of conditions, then an aircraft that initiates a maximum effort to stop a takeoff at the action speed may have an excess of unused runway remaining in front of it after the aircraft comes to a stop. Alternatively, if the aircraft has an engine fail just after reaching the action speed, and continues the takeoff by the departure end of the runway, the aircraft may be above some required height. One of ordinary skill in the art understands that when the aircraft's actual performance exceeds "book value," the aircraft could have taken off at some greater gross weight that would allow the remaining runway after a maximum effort to stop the aircraft is begun at the action speed to be close to zero and the height of the aircraft at the departure end of the runway after continuing a takeoff with an engine failure at the action speed to be right at the required height.

The illustrative embodiments recognize and take into account one or more different considerations. Those embodiments recognize and take into account that it would be desirable to achieve the technical effect of virtually extending a length of a runway being used for takeoff, and/or virtually reduce a thrust required to be used for takeoff on a given runway. The illustrative embodiments recognize and take into account that having a machine and a process technically capable of presenting, not a preset and unchanging action speed, but instead a dynamic decision speed that can provide the technical effects described above.

Further, the illustrative embodiments recognize and take into account that it would be desirable to achieve the technical effects for an aircraft as described above without having to retrofit and/or replace equipment previously certified on board an aircraft certified as airworthy. For example, the illustrative embodiments recognize and take into account that the technical effects of updating computer codes on some of the equipment currently installed in an aircraft currently certified for flight with specially programmed codes may enable the aircraft to be certified to takeoff at a greater gross weight, using less thrust, and/or on a shorter runway than the same aircraft using a preset and unchanging action speed determined before the takeoff roll based upon "book values," without the specially programmed codes providing a dynamic decision speed, also known as a "runway extension speed."

The illustrative embodiments recognize and take into account that in actual operation, not every aircraft and/or every operator of the aircraft accelerate at a rate assumed by the "book values" used to determine a static decision speed before a takeoff. The process and machine shown in the illustrative embodiments provides the technical effects for dynamically creating and presenting a runway extension speed (dynamic decision speed) that continuously updates during a takeoff roll.

With reference now to the figures, and in particular, with reference to FIG. 1, an illustration of a side view of a takeoff profile for an aircraft using a static action speed based upon preexisting table values for an assumed aircraft and engine accelerations for an aircraft with a given a thrust at a given takeoff weight and a particular set of conditions is depicted in accordance with a non-limiting illustrative embodiment. More specifically, takeoff profile 100 shows a takeoff surface of runway 102 with aircraft 104 stopped with its nose just above departure end 106 of runway 102 after a maximum effort stop of aircraft 104 that began at point 108, also known as the point at which aircraft 104 reaches a speed called "V1" and defined as currently defined in US 14 CFR 1.2 as "the maximum speed in the takeoff at which the pilot must take the first action (e.g., apply brakes, reduce thrust, deploy speed brakes) to stop the airplane within the accelerate-stop distance." Although V1 is a speed at which actions are initiated for a maximum effort stop of aircraft 104, it is often referred to by the misnomer "decision speed." One of ordinary skill in the art understands that to have actions actually initiate at point 108, that a decision must have been made before the action begins.

Point 108 is located after an engine failure at point 110, which is a point on the takeoff roll where an engine on aircraft 104 fails to continue operating. At point 110, aircraft 104 will be at a speed referred to as "VEF", or what US 14 CFR 1.2 defines as "the speed at which the critical engine is assumed to fail during takeoff," or commonly referred to as "engine failure speed."

For aircraft 104 to be certified (as a non-limiting example, by the United States Federal Aviation Administration (FAA)), in accordance with, as a non-limiting example, one of: current United States 14 Code of Federal Regulations (CFR) Part 01, 21, 23, 25, 39, and/or 47) for takeoff, before taking off on runway 102, aircraft 104 must designate a V1 speed that allows aircraft 104 to accelerate to point 110, have an engine on runway 102 fail to produce an amount of thrust planned for takeoff on runway 102, allow for some established pilot reaction time, and then initiate the first action for using maximum effort to terminate the takeoff and come to a complete stop just prior to departure end 106.

Although aircraft 104 is shown in the Figures having a particular form, aircraft 104 may take various forms. As a non-limiting example, aircraft 104 may be selected at least from a group that includes a cargo aircraft, a passenger aircraft, a mixed use aircraft, a jet aircraft, a propeller driven aircraft, a military aircraft, an airplane, and/or any platform that may be equipped and/or certified for flight by a regulatory agency, and/or any platform to be controlled for flight at a particular altitude in a region. Without limitation, aircraft 104 may have any number two or more engines.

The process and machine of the illustrated embodiments recognize and take into account that currently, in order to initiate, at point 108, a terminating sequence for a maximum effort to terminate the takeoff with a speed equal to the value of V1, an aircraft operator must recognize an engine failure before V1, make a decision to react, and react so as to initiate, at V1, the maximum effort to terminate the takeoff. As used herein, a terminating sequence is a sequence of events that begin with an engine failure on aircraft 104, and concludes with aircraft 104 terminating the takeoff roll, resulting in a stop of aircraft 104.

The process and machine of the illustrated embodiments recognize and take into account that current flight decks do not display VEF before the takeoff roll. Further, during the takeoff roll, VEF is not displayed. Currently, lacking the technical benefits provided by the process and machine of the illustrated embodiments, an operator of aircraft 104 must recognize a failure of an engine by feel, or by recognition of abnormal engine indications, or by recognition of an engine failure warning. An engine failure warning may be aural and/or visual, such as, without limitation, a bell and/or a warning light coming on in the flight deck.

As shown in FIG. 1, some amount of distance 112 may be travelled by aircraft 104 between point 110 and point 108 as an operator of aircraft 104 reacts to the engine failure and takes the first action to terminate the takeoff roll on the runway. As shown in FIG. 1, distance 112 plus distance 118 may be referred to as a "terminating distance" for aircraft 104 taking off on runway 102. Regulatory certification for aircraft 104 to takeoff on runway 102 may require that for aircraft 104 to takeoff, runway 102 must equal at least length 144, which is distance 114 from point 116, where aircraft 104 begins its takeoff roll, to point 110, plus distance 112, and plus distance 118 from point 108 to departure end 106. Regulations may also require runway 102 to be distance 150, which is length 144 plus some added margin 152.

The process and machine of the illustrated embodiments recognize and take into account that currently, no speed is marked or presented to an operator lacking the technical benefits provided by the process and machine of the illustrated embodiments, before or during the takeoff roll to serve the operator as an actual speed by which a decision to terminate must be made in order to ensure that the first action taken to terminate the takeoff and stop aircraft 104 on runway 102 is being made as the speed of aircraft 104 becomes V1. During flight tests for certification of aircraft 104, test pilot reaction times and distances from VEF to V1 may be recorded for use in establishing performance charts and "book values" for V1 speeds for aircraft 104.

The process and machine of the illustrated embodiments recognize and take into account that distance 114 and distance 112 will be dependent upon how quickly aircraft 104 accelerates. Acceleration of aircraft 104 may be affected by any of conditions 120, which may enhance or degrade acceleration of aircraft 104. Without limitation, conditions 120 that may affect the acceleration of aircraft 104 may include: environmental 122, surface 124, and/or equipment 126 of aircraft 104.

Environmental 122 conditions of conditions 120 may include, without limitation, air temperature 128 on runway 102, pressure altitude 130, and/or winds 132. Surface 124 conditions of conditions 120 may include, without limitation, slope 134 of runway 102, wetness 136, and/or contamination 138 on runway 102. Contamination 138 may include, without limitation, ice, slush, snow, water, and/or rubber deposits.

Equipment 126 may include configuration 140 and/or operation 142 of any one and/or more of each system and/or part located on and/or in runway 102. Operation 142 may include a functional status of equipment 126, and/or a choice of mode of operation for equipment 126. Conditions 120 of equipment, and/or environmental 122 may be sensed by sensors 154. Sensors 154 may be located at least in airport area and/or in and/or near aircraft 104.

Additionally, the process and machine of the illustrated embodiments recognize and take into account that regulations for certification of aircraft 104 may require aircraft 104 to establish, as a non-limiting example from 14 CFR 1.2 a "minimum speed in the takeoff, following a failure of the critical engine at VEF, at which the pilot can continue the takeoff and achieve the required height above the takeoff surface within the takeoff distance." 14 CFR 1.2 defines the minimum speed following the failure of the critical engine as also being the action speed V1. A profile illustrating this requirement is shown as takeoff profile 146 whereby when aircraft 104 experiences an engine failure at point 110, it continues takeoff and is at least some height 148 above departure end 106. Hence, to meet certification and/or other regulatory requirements, aircraft 104 at some set of conditions 120, may be required to have a V1 speed established that allows for both takeoff profile 100 and takeoff profile 146 to be achieved on runway 102 of length 144. This example and those below are not presented to limit takeoff performance considerations to those presented by the United States Federal Aviation Administration, but use those considerations as one example of current takeoff performance requirements and limitations thereof.

However, one of ordinary skill in the art will understand that the machine and process of the embodiments illustrated herein recognizes and takes into consideration that if runway 102 had a length of exactly length 144, that runway 102 may not actually meet the requirements for takeoff, because length 144 is measured from point 116, where the takeoff roll begins. One of ordinary skill in the art will understand that the machine and process of the embodiments illustrated herein recognizes and takes into consideration that an operator of runway 102 is most unlikely to actually begin the takeoff roll right at the beginning of runway 102. Depending on many factors, a takeoff roll may actually begin with point 116 being hundreds of feet from a beginning of runway 102.

Further still, in limited visibility, an operator on runway 102 may think they are beginning a takeoff roll from an end of runway 102, but may actually be some significant distance away from the end of runway 102. Hence, the current methods and regulations for takeoff performance computations have technical deficiencies inherent in the variations of daily flight operations and potential misperceptions by an operator of aircraft 104.

Still further, regulations may recognize that an aircraft operator may misperceive that an engine has failed and start maximum efforts to stop the takeoff with both engines still functioning normally while attempting to fully stop the aircraft. Accordingly, regulations for certification of aircraft 104 may require that other takeoff profiles (not shown in FIG. 1) be achievable as well for aircraft 104 on runway 102. As a non-limiting example, 14 CFR 25.109 may require aircraft 104 to establish:

The sum of the distances necessary to:
(i) Accelerate the airplane from a standing start with all engines operating to the highest speed reached during the rejected takeoff, assuming the pilot takes the first action to reject the takeoff at the V1, for takeoff from a dry runway; and
(ii) With all engines still operating, come to a full stop on dry runway from the speed reached as prescribed in paragraph (a) (2) (i) of this section; plus
(iii) A distance equivalent to 2 seconds at the V1, for takeoff from a dry runway.

References herein to a "stop" for aircraft 104 may be considered equivalent to the "full stop" recited in 14 CFR 25.109. While this requirement is not illustrated, it might look similar to takeoff profile 100, but distance 118 and length 144 may be a different value than achieved for takeoff profile 100. However, 14 CFR 25.109 indicates that a regulatory margin added to length 144, may also be required, as illustrated in FIG. 1, by the distance of margin 152, which represents a distance that aircraft 104 travels for two seconds at V1 speed on runway 102 when wetness 136 of surface 124 is dry. Thus, a regulatory minimum length required for aircraft 104 to be allowed to takeoff on runway 102 may be represented by distance 150, the sum of length 144 plus some buffer or margin 152.

Further, regulations for certification of aircraft 104 may require additional adjustments for changes in friction of surface 124 of runway 102, such that reductions to V1 may be required when runway 102 is wet or contaminated in order for takeoff profile 100 and takeoff profile 146 to actually be achieved by departure end 106 for runway 102. While one of ordinary skill in the art can appreciate that many combinations of conditions 120 may affect an ability of aircraft 104 to accelerate to V1, and that many combinations of conditions 120 may affect an ability of aircraft 104 to stop before departure end 106, current regulations and technical capabilities on current aircraft provide only for a single determination, based upon assumed values for acceleration and stopping capability listed in a performance manual or "book values," of a V1 value that is fixed before takeoff and remains static and unchanged throughout the takeoff, regardless of an actual current acceleration of aircraft 104.

Figure 2:
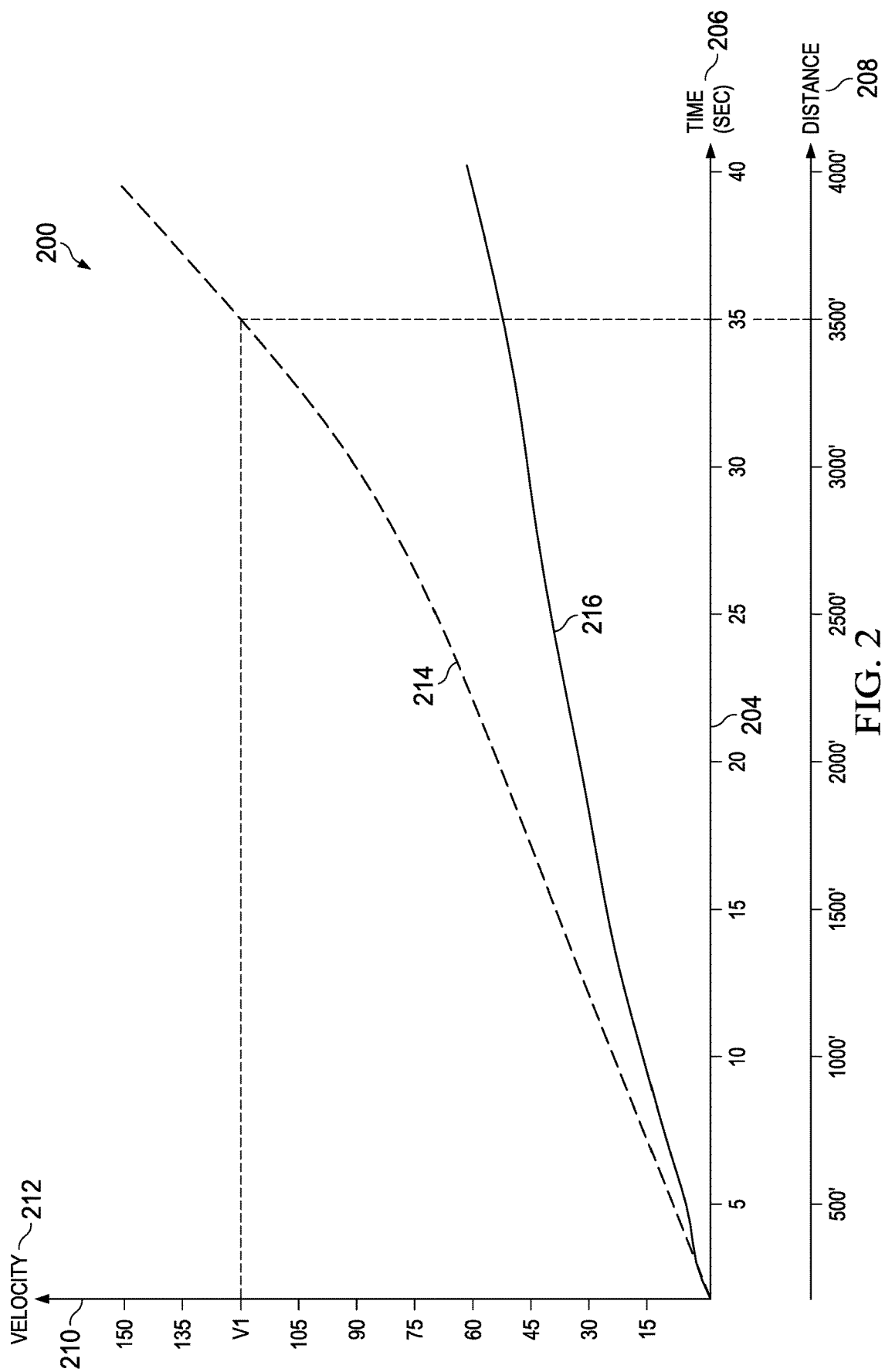
FIG. 2 is an illustration of a chart illustrating a preexisting speed profile for an aircraft depicted in accordance with a non-limiting illustrative embodiment.

Looking now to FIG. 2, an illustration of a chart illustrating a preexisting speed profile for an aircraft is depicted in accordance with a non-limiting illustrative embodiment. More specifically, chart 200 shows a speed profile with plot 214 with horizontal axis 204 depicting elapsed time 206 and also depicting distance 208 traveled along runway 102 by aircraft 104 measured from point 116 of a takeoff roll on runway 102 shown in FIG. 1. Vertical axis 210 represents a speed of aircraft 104 along a centerline of runway 102, and velocity 212. Plot 214 shows a non-limiting example of an example of a generic manufacturer's data plot for an expected acceleration of aircraft 104 at a given air temperature 128 and pressure altitude 130 for an expected amount of takeoff thrust. Hence, the expected acceleration of aircraft 104 is represented by plot 214 that presents a speed of aircraft 104 at each distance along runway 102, as well as the elapsed time from a beginning of the takeoff roll to achieve that speed. In other words, plot 214 of a preexisting speed profile for aircraft 104 presents an expected acceleration for aircraft 104 on runway 102 for a set of given conditions 120. Plot 214 of preexisting speed profile for aircraft 104 does not take into account any deviations that may occur from a set of expected conditions 120 for the takeoff.

The amount of takeoff thrust is referred to as expected, because current takeoff V1 speed charts use a specified thrust level, which in operation may vary from an actual thrust produced on any given day by an engine and/or engines actually on aircraft 104. Hence plot 214 represents a preexisting speed profile for aircraft 104 during takeoff roll based upon "book values" for expected acceleration performance of aircraft 104.

Currently, if a known configuration 140 of aircraft 104 would cause an expected reduction of acceleration for aircraft 104 illustrated by plot 214, a configuration deviation list that is available to the operator of aircraft 104 may provide an adjustment that may require an increase in thrust used for takeoff, or may reduce an allowable takeoff weight and/or change a V1 speed for aircraft 104 from the value computed based upon plot 214. A configuration deviation list may require a regulatory certification for its use to be allowable by a regulator.

Thus, as a non-limiting example, if aircraft 104 had increased drag because a panel was missing or damaged on aircraft 104, then a takeoff performance adjustment may be published in the configuration deviation list for aircraft 104. As a non-limiting example, the takeoff performance adjustment may include reductions required and certified by a regulatory agency of some number of hundreds of pounds in the maximum takeoff weight allowed, and/or a reduction of some number of knots in the V1 speed, for aircraft 104 taking off on runway 102 with distance 150.

Likewise, if it is known before takeoff that a degradation in operation 142 of some piece of equipment 126, shown in FIG. 1, that may adversely affect acceleration or reduce performance of a maximum effort stop of aircraft 104 on runway 102, then a takeoff performance adjustment may be published, without limitation, in a minimum equipment list for aircraft 104 that is available to the operator of aircraft 104. As a non-limiting example, the takeoff performance adjustment may include reductions required and certified by a regulatory agency of some number of hundreds of pounds in the maximum takeoff weight allowed, and/or a reduction in the V1 speed for aircraft 104 taking off on runway 102 with distance 150. As a non-limiting example, if aircraft 104 had an inoperative antiskid system, the takeoff performance adjustment may include reductions required and certified by a regulatory agency of some number of thousands of pounds in the maximum takeoff weight allowed, and/or a reduction in the V1 speed.

However, as noted before, once a maximum takeoff weight and V1 speed have been computed for aircraft 104 on runway 102 before commencing a takeoff roll, no further adjustments are made for the actual performance of aircraft 104 during takeoff roll that may differ from the performance indicated by the preexisting speed profile of plot 214. Thus, a technical deficiency exists in a usefulness of a V1 speed for situations where speed and distance values for an actual current acceleration of aircraft 104 to V1 speed may not align with plot 214. Such deviations during actual takeoff may also negatively affect a maximum effort stop capability of As an non-limiting example, if a malfunction of operation 142 of some piece of equipment 126 on aircraft 104, and/or an operator selection of a level of thrust less than a thrust level that plot 214 is based upon, prevents aircraft 104 from accelerating as rapidly as indicated by plot 214, then plot 216 may represent an actual speed profile for the actual current acceleration of aircraft 104 along runway 102. One of ordinary skill in the art will appreciate that if aircraft 104 does not accelerate to the V1 speed preselected based upon using an expected acceleration shown by the preexisting speed profile represented by plot 214, then when aircraft 104 reaches V1, a distance less than distance 118 and/or distance 118 plus margin 152 may remain, and a maximum effort stop, started at V1, would not prevent aircraft 104 from running off departure end 106 of runway 102 and/or past distance 150.

Likewise, if a malfunction of operation 142 of equipment 126 on aircraft 104, and/or an operator selection of a level of thrust less than the thrust level that plot 214 is based upon, prevents aircraft 104 from accelerating as rapidly as indicated by plot 214, and that takeoff were to continue after an engine failure just after V1, aircraft 104 may not be able to reach height 148 by departure end 106, or by distance 118 plus margin 152. With currently known systems, the technical deficiencies of aircraft 104 experiencing plot 216 for a takeoff planned for plot 214 are not recognized and the operator of aircraft 104 is not alerted thereto in real time during a takeoff.

Hence, for a takeoff where the allowed takeoff weight is based upon an expected acceleration and thus upon a preexisting speed profile, represented by plot 214, and an operator taking off in aircraft 104 at that allowed takeoff weight uses a "book value" V1 speed taken from a manufacturer's chart, for any actual speed profile that lies below plot 214, such as, without limitation, plot 216 in FIG. 2, aircraft 104 may reach a V1 predesignated for conditions 120 on runway 102 at a location on runway 102 that does not allow for compliance with regulatory requirements for takeoff performance, which would be at some point right of point 108 shown in FIG. 1. Thus, a technical benefit is produced by the process and machine of the illustrated embodiments herein that recognize, in realtime, when an actual speed profile for aircraft 104 during takeoff is not aligning with plot 214.

Thus, technical benefits are provided when sensors 154 sense and report configuration 140 and operation 142 of equipment 126 on aircraft 104 of FIG. 1. Without limitation, sensors 154 may include accelerometers, speed indicators, air pressure sensors, temperature sensors, and/or position identifiers, which may include portions of, without limitation, a Global Navigation Satellite System (GNSS), an inertial navigation system, and/or inertial reference system.

Hence, a technical advantage is realized when a specially coded computer program in a processor in communication with aircraft 104 receives configuration 140 and operation 142 of equipment 126 on aircraft 104 and creates a new speed profile for aircraft 104 that is an actual speed profile that projects the current acceleration of aircraft 104 in realtime.

Without limitation, sensors 154 may relate to and/or be located on aircraft 104, and/or on runway 102 and/or an airport and/or an area around runway 102. Thus, sensors 154 may provide information about environmental 122 and/or surface 124 conditions 120 as well as conditions 120 for equipment 126.

From the creation of a speed profile that is based upon the actual current acceleration of aircraft 104, called the "actual speed profile", numerous technical benefits including at least a reduction of required takeoff thrust, maximum allowable takeoff weight being increased, or virtually providing a runway extension for aircraft 104 may be produced. Hence, the special program and/or the processor executing the code of the special program may be referred to as the ROTTOWIRE (reduction of thrust/takeoff weight increase/runway extension). The ROTTOWIRE may be a piece of and/or located in a piece of equipment 126 on aircraft 104. For each distance along runway 102, the ROTTOWIRE receives a current speed and a current acceleration for aircraft 104, and in real-time, based upon actual conditions 120, projects out the extension of plot 216 to the right of a current speed for aircraft 104, such that the actual speed profile created by the ROTTOWIRE for aircraft 104 is continuously being created in real time throughout the takeoff roll of aircraft 104.

ROTTOWIRE technical benefits will first be described for cases where aircraft 104 performs exactly to preexisting "book value" predictions. Thus, actual current acceleration of aircraft 104 results in ROTTOWIRE creating an actual speed profile identical to plot 214. However, ROTTOWIRE will present an indication that provides a helpful improvement to an operator trying to decide whether to continue the takeoff or stop the takeoff upon a failure of an engine. Currently, if VEF, a speed at failure of a critical engine, occurs well below reaching V1 speed at point 108, the operator decision is and easy one, stop. If an engine fails after aircraft 104 reaches V1 speed, the decision is also easy, continue the takeoff. But as the speed indicated to an operator approaches V1 speed, the operator has no way of knowing how long it took the test pilots to initiate maximum effort stopping after VEF, or how long it will take them, and thus what speed aircraft 104 will actually have when initiating a maximum effort stop after recognizing an engine failure.

The ROTTOWIRE provides a technical improvement to overcome and improve operational decisions facing that uncertainty. Because ROTTOWIRE has created the actual speed profile for aircraft 104 based upon the actual current acceleration of aircraft 104, at any speed approaching V1 SPEED, ROTTOWIRE can determine how much time it will take to reach V1 speed, and how far from departure end 106 of runway 102 aircraft 104 will be at V1 SPEED.

Thus, using a known time of pilot reaction from VEF to initiating a maximum effort stop, the ROTTOWIRE can direct other equipment 126 on aircraft 104 to display to the operator, a real decision speed. The real decision speed, in contrast to a V1 speed, may be a speed at which, if an engine failure was recognized, and a reaction time allowed, a maximum effort stop would actually be initiated at V1 speed, as indicated in FIG. 2. The reaction time may be a time from VEF, the failure of a critical engine on aircraft 104, for a recognition of that engine failure, and the time it takes to make a decision about what actions must be initiated, and the time from that decision until the actions are actually initiated. The reaction time used by the ROTTOWIRE may be set in ROTTOWIRE based upon original test pilot certification reaction times from VEF to V1 speed.

Alternatively, the reaction time may be set in the ROTTOWIRE based upon a company chosen value, which may be based upon the company's records for average pilot reaction times recorded during simulator training. Alternatively, the reaction time used by the ROTTOWIRE may be entered by an operator for each flight based upon the individual pilot's actual reaction times during the individual pilot's own simulator training sessions. Likewise, a reaction time tied to the individual pilot may be entered by a particular pilot into the ROTTOWIRE on the particular one of aircraft 104 being flown by the particular pilot, or automatically received into the ROTTOWIRE via an input to the ROTTOWIRE from a database housing the individual pilot's actual reaction times during the individual pilot's own simulator training sessions.

Without limitation, an input into the ROTTOWIRE of an individual pilot's identity and/or reaction time can be provided by information present in a flight plan or other data that may be uplinked into a flight management computer and/or other flight management system and/or data management processor in aircraft 104. Thus, knowing a reaction time from VEF to V1 speed, and knowing the actual speed profile that aircraft 104 is accelerating along, the ROTTOWIRE can determine, using the reaction time set in the ROTTOWIRE, a speed at which an engine failure could occur and allow the operator/pilot to recognize, react, and initiate at V1 speed a maximum effort stop for aircraft 104. For reasons further explained below, this new speed that serves effectively as a real time recognition/reaction speed, is called a "Westphal-Shulze speed" (WS) or a "runway extension speed." The ROTTOWIRE will display and/or alert the Westphal-Shulze speed (WS)/runway extension speed to the operator.

Figure 3:
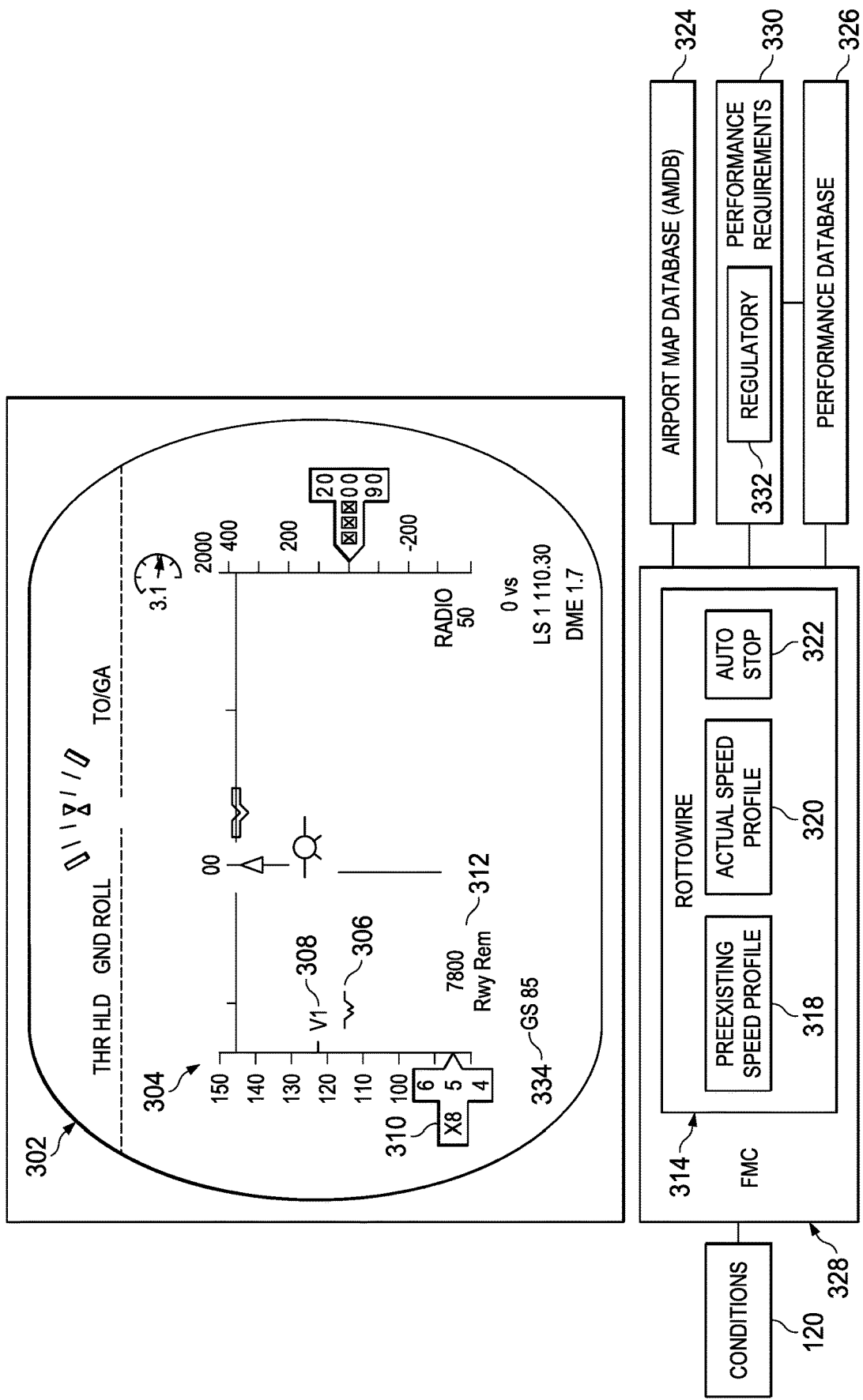
FIG. 3 is an illustration of an instrument display in an aircraft that shows a runway extension speed depicted in accordance with a non-limiting illustrative embodiment.

With reference now to FIG. 3, an illustration of an instrument display in an aircraft that shows a runway extension speed is depicted in accordance with a non-limiting illustrative embodiment. In one non-limiting illustrative example, one or more technical solutions are present that overcome a technical problem with takeoff performance limits for aircraft 104 shown in FIG. 1. More specifically, as a non-limiting example, an instrument display is shown for aircraft 104 as a heads up display 302 with speed tape 304 indicating airspeed of aircraft 104. Runway extension speed 306 is shown in FIG. 3 indicated by a winged "W" as a speed prior to indication 308 of V1 SPEED. Runway extension speed 306 thereby clearly indicates a speed that once exceeded, if an engine failure is recognized, the decision should be made to continue the takeoff.

In FIG. 3, runway extension speed 306 shows the speed an operator can view and know so that when the operator recognizes an engine failure after runway extension speed 306, the operator should continue the takeoff instead of trying to stop aircraft 104 on runway 102. When the operator recognizes an engine failure before aircraft 104 reaches runway extension speed 306, it is clear aircraft 104 has not reached runway extension speed 306 and must initiate a maximum effort stop.

Accordingly, any former usefulness of indication 308 of V1 speed to an operator is now preempted by the more useful runway extension speed 306. Runway extension speed 306 is more useful than indication 308 of V1 speed at least because runway extension speed 306 eliminates a need for an operator of aircraft 104 to make an instantaneous assessment of whether they believe the can actually get a maximum effort stop initiated by indication 308 of V1 speed. In other words, runway extension speed 306 replaces an operator's reliance on the static indication 308 of V1 speed, which indicates a speed at which action must be initiated for a maximum effort termination of the takeoff, and which was based upon only preexisting performance expectations for aircraft 104 (also known as "book values"). In contrast, ROTTOWIRE 314 creates a dynamic runway extension speed 306 and provides a dynamic indication thereof, based on continuously updating real time performance of aircraft 104 throughout a takeoff roll. ROTTOWIRE 314 creates runway extension speed 306 that dynamically provides an operator of aircraft 104 with a continuously updated speed in real-time that denotes for a decision point to instantly direct a decision to either continue a takeoff into the air, or to make a maximum effort stop on the runway. Hence, at least because the technical benefit to an operator making a decision to continue or to stop/terminate a takeoff of a dynamic Westphal-Schulze/runway extension speed 306 is far more useful than current V1 speed, if approved by regulators, computation of V1 speed and/or its indication 308 may be eliminated from speed tape 304 display.

In FIG. 3, runway extension speed 306 is shown on heads up display 302. One of ordinary skill in the art understands that the presentation of runway extension speed 306 can be made in any format clearly perceivable to an operator of aircraft 104. Without limitation, runway extension speed 306 could be presented on heads up display 302 or on any other flight instrumentation such as, without limitation, one or more primary flight display units, and/or aurally. One of ordinary skill in the art further understands that the winged "W" indication for runway extension speed 306 shown in FIG. 3 is a non-limiting example. Other indicators may be chosen, such as, without limitation "WS" that would be recognized as runway extension speed 306 to an operator of aircraft 104.

ROTTOWIRE 314 also provides other technical benefits even when actual speed profile 320 for aircraft 104 during an actual takeoff happens to generally align with preexisting speed profile 318. Preexisting speed profile 318 may be illustrated, as a non-limiting example, by plot 214 in FIG. 2. ROTTOWIRE 314 continuously receives inputs of a location of aircraft 104 and derives and updates a precise length of runway remaining for any point where aircraft 104 is located on runway 102. The precise length of runway remaining may be determined by ROTTOWIRE 314. ROTTOWIRE 314 may derive the precise length of the runway remaining via input from sensors 154 of coordinates for a current location of aircraft 104, and communication with airport map database 324 (AMDB) that provides coordinates of departure end 106 for runway 102.

Further, ROTTOWIRE 314 is also specially programmed to determine an actual energy state for aircraft 104 and related thereto, a distance required for aircraft 104 to stop using maximum effort under actual real time conditions 120 for aircraft 104 on runway 102. Without limitation, the actual energy state of aircraft 104 may be based upon the mass of aircraft 104 times the velocity of aircraft 104 squared ($mV^2$). One of ordinary skill in the art recognizes that speed tape 304 shows an indicated airspeed, and that if aircraft 104 were sitting still on runway 102 in a 50 knot headwind, speed tape 304 would present indicated airspeed 310 as 50 knots, even though aircraft 104 would require no energy or distance to bring the stationary aircraft 104 to a stop. Hence, also distinct from V1 speed calculations, commonly used prior to the new process and machine described herein, even though runway extension speed 306 is displayed along speed tape 304 that displays an indicated airspeed of aircraft 104 to the operator of aircraft 104, ROTTOWIRE 314 creation of runway extension speed 306 is actually derived from inputs to ROTTOWIRE 314 of the actual speed that aircraft 104 is travelling along runway 102, or a ground speed of aircraft 104, and/or derivations thereof. In FIG. 3, ground speed 334 for aircraft 104 is presented in heads up display 302 as "GS." As a non-limiting example shown in the illustrated embodiment of FIG. 3, ground speed 334 is presented at a value of 85 knots.

ROTTOWIRE 314 is shown in FIG. 3, as a non-limiting example, as being within flight management computer 328 (FMC). However, the illustrated embodiments described herein recognize and take into consideration that ROTTOWIRE 314 may be located independently from flight management computer 328, and/or within another processor on aircraft 104 such as, without limitation, a portion of a Flight Management System (FMS), an Electronic Flight Instrument System (EFIS), and/or components of an Airplane Information Management System (AIMS). The illustrative embodiments described herein recognize and take into consideration that ROTTOWIRE 314 may be located in such a location as to be in communication with flight management computer 328, and/or other processors in aircraft 104, such as, without limitation, a portion of a Flight Management System (FMS), an Electronic Flight Instrument System (EFIS), and/or components of an Airplane Information Management System (AIMS).

Hence, if a preexisting V1 speed was computed based upon a preexisting prediction of plot 214, aircraft 104 starting takeoff roll at point 116 would stop at departure end 106 of runway 102 when the actions begin at V1 speed to initiate a maximum effort stop that terminates the takeoff. However, one of ordinary skill in the art will recognize that, as a non-limiting example, if aircraft 104 is already 300 feet down runway 102 before actually beginning acceleration of the engines on aircraft 104 to takeoff thrust, then aircraft 104 would not achieve V1 speed until at least 300 feet to the right of point 108, and if an engine failed just prior to V1 speed, after a maximum effort stop aircraft 104 would run past departure end 106 at least 300 feet, or be less than height 148 if takeoff was continued.

Thus, in contrast to the use of a V1 speed presented to an operator based upon an assumption of how far down runway 102 the acceleration to V1 begins, ROTTOWIRE 314 receives or derives an actual distance down runway 102 from the beginning of runway 102 and an actual distance remaining to departure end 106 of runway 102, that aircraft 104 is at every point along takeoff roll, and uses an actual speed profile, derived from actual current speed and acceleration of aircraft 104, for determining a point on runway 102 that aircraft 104 will be located that will result in aircraft 104 stopping at departure end 106 or continuing to height 148, after an engine failure, and/or any other change in conditions 120 that may affect acceleration or braking of aircraft 104. Based upon that point on runway 102, and knowing the actual current acceleration based actual speed profile of aircraft 104, ROTTOWIRE 314 derives runway extension speed 306, displayed in FIG. 3 as the winged "W" on heads up display 302.

Hence, in a case where aircraft 104 may enter runway 102 at some point that may be 1,000 feet closer to departure end 106 than intended, ROTTOWIRE 314 would recognize less runway remaining than a V1 or an initial runway extension speed 306 were calculated for, and ROTTOWIRE 314 would instantly determine a new runway extension speed 306, and command the displayed "W" to that new runway extension speed 306 value on speed tape 304. In that case, an operator pulling onto the runway would notice a jump displayed "W" of runway extension speed 306 on speed tape 304 to the of the new runway extension speed 306 as aircraft 104 pulls onto runway 102.

Prior to pulling onto runway 102, ROTTOWIRE 314 displays runway extension speed 306 based upon a planned takeoff length of the planned runway, and plot 214 based upon a "book value" based preexisting speed profile 318 for acceleration of aircraft 104 at conditions 120 for the current takeoff on runway 102. Without limitation, ROTTOWIRE 314 may receive a planned runway from a flight management computer or other navigation and/or performance computer and/or a thrust management system and/or takeoff performance system computer on and/or in communication with aircraft 104 and/or other data uplinked thereto, such as, without limitation, a flight plan, load closeout, and/or performance data.

Hence, another technical advantage of a machine and a process described in the embodiments herein is that ROTTOWIRE 314 access to and communication with airport mapping data and aircraft navigation systems allows ROTTOWIRE 314 to determine the actual runway 102 that aircraft 104 lines up on for takeoff. As a non-limiting example, currently if an operator of aircraft 104 planned and obtained a V1 speed for a takeoff on a runway with a centerline along a 090 degree track, but instead lined up to takeoff on a runway having a centerline along a 120 degree track, the operator would not be using takeoff performance information required, at least by a regulatory agency, for takeoff on the runway with the centerline along the 120 degree track.

In contrast, in that same scenario, ROTTOWIRE 314 presenting runway extension speed 306 at a speed for the planned takeoff on the runway with the centerline along the 090 degree track, would recognize that aircraft 104 had instead lined up on the runway with the centerline along the 120 degree track, and instantly change runway extension speed 306 displayed to be appropriate for the amount of runway remaining on the runway with the centerline along the 120 degree track. ROTTOWIRE 314 additionally could send an indication and/or an alert that the runway extension speed 306 shift was due to aircraft 104 not being on the same runway 102 for which runway extension speed 306 was originally planned for and indicating.

Additionally, ROTTOWIRE 314 may determine and send the runway remaining distance using measurements from sensors 154, shown in FIG. 1, that provide the precise location of aircraft 104 and a known departure end 106 for runway 102, accessed from airport map database 324 and/or some other source. ROTTOWIRE 314 may display the distance of runway remaining 312 on heads up display 302 as indicated in FIG. 3. Runway remaining 312 generated by ROTTOWIRE 314 may replace a previous display of runway remaining 312 distance that was provided from rough calculations based upon a runway distance value received into a heads up guidance computer before takeoff for the planned runway.

ROTTOWIRE 314 may create a new runway extension speed 306 each time any input to ROTTOWIRE 314 may be updated. Thus, as a non-limiting example, if a Global Positioning Satellite system in aircraft 104 updated a position of aircraft 104 every $\frac{1}{100}^{th}$ of a second, runway extension speed 306 would be updated every $\frac{1}{100}^{th}$ of a second. In other words, updating of runway extension speed 306 by ROTTOWIRE 314 occurs continuously in real time. The display of runway extension speed 306, as shown on heads up display 302, may also be updated as frequently, or may be updated at some lesser time cycle such as, without limitation, every second. A lesser time cycle for displays of runway extension speed 306 may be used to stabilize a visibility of runway extension speed 306 on speed tape 304. Also, to settle the image presented of runway extension speed 306 for easier viewing, and without limitation, updating the frequency of display of runway extension speed 306 may vary as indicated airspeed 310 of aircraft 104 approaches runway extension speed 306.

The illustrated embodiments also recognize and take into account, that if the time from VEF to initiating a maximum effort stop for aircraft 104 can be reduced or eliminated, then aircraft 104 would stop before departure end 106 as shown in FIG. 1, at least because distance 112, shown in FIG. 1, could be reduced or eliminated. Thus, ROTTOWIRE 314 being able to eliminate distance 112 as part of takeoff performance computations for aircraft 104 provides a virtual extension of the runway. Aircraft 104 can utilize the virtual runway extension provided by ROTTOWIRE 314 to facilitate a takeoff weight increase and/or a reduction of thrust used for takeoff by aircraft 104 on runway 102 under current conditions 120. Hence, ROTTOWIRE 314 may also be considered and referred to as being specially programmed and configured to function as a takeoff envelope expander for aircraft 104.

More specifically, ROTTOWIRE 314 may be specially programmed to operate with a time from VEF to aircraft 104 initiating maximum effort stop being near zero, or instantaneous. This operating mode for ROTTOWIRE 314 may be referred as auto stop mode 322 for ROTTOWIRE 314.

In auto stop mode 322, ROTTOWIRE 314 may communicate with and/or command without limitation at least: an engine control system, an autobrake system, a thrust reverse control system, an auto-throttle system, a ground spoiler system, and/or a communications system, on aircraft 104. Auto stop mode 322 may be preprogrammed into ROTTOWIRE 314 to always be operational, or may be a selectable mode that may be activated through an input received by ROTTOWIRE 314 before takeoff. Such an input to ROTTOWIRE 314 may be autonomously triggered based upon factors that may include particular states of conditions 120.

When ROTTOWIRE 314 recognizes an engine failure, it may issue commands for a terminating sequence for the takeoff that immediately initiates a maximum effort stop of aircraft 104 and concludes with terminating the takeoff roll to a stop of aircraft 104 on runway 102. Still further, based upon an operator desires or regulatory directives, ROTTOWIRE 314 may be programmed such that auto stop mode 322 may be activated based upon other specified combinations of conditions 120, which may without limitation, include a failure of a system other than a critical engine. In other words, auto stop mode 322 in ROTTOWIRE 314 may be programmed to also initiate termination of a takeoff based upon determining some conditions 120 other than a critical engine failure at VEF.

Current common procedures for a maximum effort stop for aircraft 104 includes an auto braking system applying main wheel brakes at a rejected takeoff level by an antiskid braking system controlling the main wheel brakes of aircraft 104, while simultaneously bringing all engines to idle thrust, followed promptly by fully deploying ground spoilers and then brining the operating engines into full reverse thrust. ROTTOWIRE 314 provides the technical effect of not only eliminating distance 112, but also enhancing a maximum effort stop, in contrast to current capabilities and simultaneous with rejected takeoff braking, not only bringing all engine thrust to idle, but also simultaneously deploying full ground spoilers, initiating reverse thrust, and transmitting an announcement to air traffic control that aircraft 104 is stopping on a particular runway.

ROTTOWIRE 314 recognizes which numbered runway 102 aircraft 104 is using at an airport by at least receiving location coordinates for aircraft 104 and data provided to ROTTOWIRE 314 from airport map database 324. ROTTOWIRE 314 may also know a flight number for aircraft 104 from inputs received from data in flight management computer 328 for aircraft 104. Hence, when ROTTOWIRE 314 recognizes an engine failure, when operating with auto stop mode 322 selected, an automated voice system—which may be associated with or similar to those used currently for flight deck landing minimum alerts—may transmit, as a non-limiting example, "Flight 1529 stopping on runway 34."

Because ROTTOWIRE 314 instantaneously provides all elements of a maximum effort stop immediately following an engine failure, ROTTOWIRE 314 provides the technical effect of not only effectively eliminating distance 112, but of also reducing distance 118, as compared to aircraft 104 operating without ROTTOWIRE 314 by eliminating any delays in applying elements of a maximum effort stop while also issuing an immediate notification to air traffic control. ROTTOWIRE 314 may be specially programmed to accept inputs that accommodate changes in regulatory requirements that affect creation of runway extension speed 306, such that ROTTOWIRE 314 special programming for creation of runway extension speed 306 may be updated to remain current, and/or have accept selections of particular requirements selected from a collection of various regulatory requirements, such that ROTTOWIRE 314 special programming for creation of runway extension speed 306 will meet all regulatory requirements for a place and a time at which aircraft 104 operates.

Thus, if aircraft 104 operates in several countries where requirements for takeoff performance differ, ROTTOWIRE 314 may recognize a current location, and create runway extension speed 306 appropriate for the current location and regulations. Likewise, if regulations change for a particular area or type of aircraft 104, then the programmed features of ROTTOWIRE 314 allow for an update that adjusts the creation of runway extension speed 306 to new regulations. As a non-limiting example, current United States regulations (such as, without limitation, Federal Aviation Regulation 25.109) do not permit including the contribution of reverse thrust in computing a maximum effort stop distance on a dry runway, but do allow use of the contribution of reverse thrust in computing a maximum effort stop distance on a wet runway. ROTTOWIRE 314 may receive inputs that adjust runway extension speed 306 computations based upon runway surface 124 as well as other conditions 120.

Likewise, current United States regulations (such as, without limitation, Federal Aviation Regulation 25.109) may predicate maximum effort stopping distance for aircraft 104 based upon rated tire pressure values. ROTTOWIRE 314 may receive a value for a tire pressure from each tire via sensors 154 for equipment 126 of operation 142, and use actual tire pressures for determination of an actual runway braking coefficient of friction for aircraft 104 in conditions 120 that affects creation of a dynamic runway extension speed 306 for aircraft 104 on runway 102.

As mentioned above, an operator may misperceive an engine failure and inappropriately initiate a maximum effort stop at a speed that is too close to V1 to allow aircraft 104 to stop before departure end 106 of runway 102 because all engines actually remain running. ROTTOWIRE 314 determines an engine failure based upon operation 142 and configuration 140 reported for each engine.

Thus, ROTTOWIRE 314 may be specially programmed to recognize an engine failure based upon a definition provided to ROTTOWIRE 314 from, without limitation, a manufacturer, an owner, or an operator of aircraft 104. As a non-limiting example, an engine failure may be defined to ROTTOWIRE 314 as an "N2" value for an engine being 55% after having advanced past 85%.

ROTTOWIRE 314 may be programmed to receive such an input, and/or any other needed selections—such as, without limitation, the selection of auto stop mode 322 of operation for ROTTOWIRE 314—via an input unit to ROTTOWIRE 314 accessible to the operator and/or the owner. Without limitation, the input unit may be via a control display unit. Without limitation, the control display unit may be associated with flight management computer 328.

ROTTOWIRE 314 may provide similar benefits of virtually extending a runway length and thereby allowing a takeoff weight increase, and/or a reduction of thrust used for takeoff under set conditions 120 for runway 102, even when auto stop mode 322 is not selected. The process and machine of the illustrated embodiments recognize and take into account that on any given day, for any particular engine failure, a particular operator of aircraft 104 may take less or more time reacting after VEF at point 110, than the time and distance represented by distance 112, as shown in FIG. 1.

When an input for an operator's decision time from VEF to V1 is less than that allowed by a manufacturer's previous determination for the static V1 speed, then distance 112 is effectively reduced. Such a reduction virtually extends an amount of runway available for takeoff.

Another technical effect that ROTTOWIRE 314 may provide is regulation of a rejected takeoff mode of an auto brake mode on aircraft 104. Currently, a rejected takeoff mode on many autobrake systems is activated fully by some limited number of inputs. As a non-limiting example, with antiskid system operating and aircraft speed greater than 90 knots on the ground, when thrust levers are brought to idle, the auto brake system executes rejected takeoff braking.

Autobrake systems on current aircraft do not know how much runway remains when the rejected takeoff braking is applied. Hence, even well short of V1 on an excessively long runway, if thrust levers are brought to idle at 130 knots, rejected takeoff autobraking systems on current aircraft will activate full rejected takeoff braking and possibly result in overheated brakes or further damage to brakes and wheels. In contrast, ROTTOWIRE 314 will know exactly the runway remaining, the energy state of aircraft 104, and the amount of braking force required to stop aircraft 104 at any desired distance from departure end 106 of runway 102. Hence, ROTTOWIRE 314 can command, thru the auto braking and/or antiskid or other applicable systems, a modified application of main wheel brakes at a level less than full rejected takeoff braking that still brings aircraft 104 to a stop a some desired distance before departure end 106. Hence an added technical advantage of ROTTOWIRE 314 over aircraft without ROTTOWIRE 314 may be reduced brake wear and heating during a rejected takeoff.

The illustrated embodiments recognize and take into account that currently, using V1 speed to determine point 108, no adjustment can be made for any degradation or failure of equipment 126 that may occur after aircraft 104 enters runway 102 for takeoff. ROTTOWIRE 314 offers the technical advantage that if, as a non-limiting example, an autobrake system failed as aircraft 104 began rolling down runway 102, ROTTOWIRE 314 derivation of a distance required to stop aircraft 104 would be updated instantaneously, and runway extension speed 306 would be adjusted for runway 102. Accordingly, based upon a new operation 142, as reported by sensors 154 of the autobrake system, a new value for runway extension speed 306 would be created instantaneously by ROTTOWIRE 314 based upon the current distance remaining until departure end 106, and the new breaking capability of aircraft 104. As a non-limiting example, a new operation 142 of the autobrake system, as reported by sensors 154 of the autobrake system may allow ROTTOWIRE 314 to compute a stopping distance based upon some percentage of braking performance and deceleration available relative to operation 142 of autobrake system applying 100 Percent of available braking.

Additionally, because ROTTOWIRE 314 receives inputs that allow it to derive an actual distance of the runway remaining before departure end 106 for aircraft 104, an actual energy state of aircraft 104, and an actual braking coefficient of friction (as described without limitation, at least by FAR 25.109) for aircraft 104, then it is anticipated that runway margins currently required by regulatory agencies, such as, without limitation, the runway traveled by aircraft 104 for two seconds at V1 required by FAR 25.109, will be eliminated. Thus, ROTTOWIRE 314 will provide the added technical benefit of an additional virtual runway extension by allowing aircraft 104, on any runway length required by regulations using V1 instead of runway extension speed 306 produced by ROTTOWIRE 314, to meet requirements for the actual ability to stop on runway 102 by departure end 106 or continue takeoff to height 148 or higher, but at a greater gross weight, or a reduced takeoff thrust compared to aircraft 104 using V1 based on takeoff performance analysis based upon fixed preexisting speed profiles alone.

Information for the planned takeoff may include data about aircraft 104, runway 102, and conditions 120. Without limitation, information can include configuration 140 and operation 142 from sensors 154, a Notice to Airmen (NOTAM) and/or weather information, such as, without limitation, Automatic Terminal Information Service (ATIS) for the airport, and preexisting performance data for aircraft 104. Preexisting performance data may be stored in performance database 326 for aircraft 104.

Preexisting performance data may include preexisting speed profile, as represented by plot 214 for aircraft 104 in FIG. 2. Plot 214 may be based upon manufacturer's data, and/or may be computed by ROTTOWIRE 314, and/or another processor for aircraft 104, and stored in performance database 326 based upon actual recent performance of aircraft 104 during previous takeoffs. Recent performance may be determined based upon actual performance by aircraft 104 during some number of takeoffs and/or some number of days preceding the current operation. The number of takeoffs and/or the number of days preceding the current operation that establish recent performance of aircraft 104 may be selected and/or programmed into ROTTOWIRE 314 by an owner or manufacturer of aircraft 104.

ROTTOWIRE 314 also receives performance requirements 330 for aircraft 104. Performance requirements 330 may include any requirements desired by, without limitation, a manufacturer, an owner, and/or an operator, as well as governmental and/or regulatory performance requirements 332. Hence, although the illustrative examples herein make reference to current United States Federal Code and Federal Aviation Regulations performance requirements, ROTTOWIRE 314 may be updated to dynamically create and/or present runway extension speed 306 based upon any desired or mandated performance requirements.

With reference now to FIG. 4, an illustration of a high-level flowchart for actions driven by a logic specially programmed into a ROTTOWIRE is depicted in accordance with a non-limiting illustrative embodiment. Specifically, process 400 begins when a ROTTOWIRE receives information for a planned takeoff on a particular runway under current conditions (operation 402).

Process 400 continues such that, for each speed along a preexisting speed profile, and current conditions, the ROTTOWIRE will determine a distance from an aircraft to a departure end of a planned runway; determine a distance for an aircraft to complete a maximum effort stop on the planned runway; determine the distance to complete, with an engine failed, a maximum effort stop on the planned runway; and determine the distance, with a failed engine, to climb to a desired height at the departure end of the planned runway (operation 404). Desired height may be height 148 as shown in FIG. 1. Based upon analysis of the determinations of operation 404, the ROTTOWIRE may create and display a runway extension speed for the planned runway (operation 406).

Additionally, the ROTTOWIRE may receive a location of the aircraft at an airport (operation 408). The ROTTOWIRE may also recognize an actual runway that the aircraft lines up on for takeoff (operation 410). The ROTTOWIRE then updates the runway extension speed for the actual location of the aircraft on the actual runway (operation 412).

The Aircraft begins a takeoff roll on the actual runway (operation 414), and the ROTTOWIRE creates an actual speed profile for the takeoff roll of the aircraft (operation 416).

Using the current position of the aircraft on the actual runway for each speed along the actual speed profile and current conditions, determine the distance from the aircraft to the departure end of the actual runway; determine the distance for the aircraft to complete a maximum effort stop on the actual runway; determine the distance to complete, with an engine failed, a maximum effort stop on the actual runway; and determine the distance, with the engine failed, to climb to a desired height (operation 418). The height may be above the actual runway, without limitation, as shown by height 148 in FIG. 1.

Additionally, the ROTTOWIRE will create and display the runway extension speed for the actual runway (operation 420), and throughout the takeoff roll, continuously update the actual speed profile and the runway extension speed (operation 422). Command and initiate, responsive to an engine failure with the ROTTOWIRE in an auto stop mode and an indicated airspeed at least one of: equal to, or below, the runway extension speed, a maximum effort stop for the aircraft (operation 424).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Transmit, responsive to the engine failure, with the ROTTOWIRE out of the auto stop mode and the indicated airspeed at least one of: equal to, or below, runway extension speed, a "STOP" command (operation 426). The "STOP" command may be presented to an operator via a flight instrument, such as, without limitation, a heads up display, aurally, and/or visually, via, without limitation, a warning system perceivable by the operator of the aircraft. The "STOP" command may include removing a speed tape from the heads up display. Transmit, responsive to the indicated airspeed becoming greater than the runway extension speed, a "CONTINUE" command, and remove the runway extension speed from the display (operation 428). The "CONTINUE" command may be presented to an operator via a flight instrument such as, without limitation, heads up display 302, and/or aurally and/or visually via without limitation, any system perceivable by the operator of aircraft 104.

One of ordinary skill in the art understands that based upon a preference, without limitation, of at least one of a regulatory agency, a manufacturer of aircraft 104, an owner of aircraft 104, and/or an operator of aircraft 104, that the "STOP" command and the "CONTINUE" command may each be presented using other selected words. As a non-limiting example, ROTTOWIRE 314 may be programmed to announce "GO" when indicated airspeed 310 becomes greater than runway extension speed 306 instead of "CONTINUE" to shorten the number of syllables, and therefore amount of time used by the command.

Figure 5:
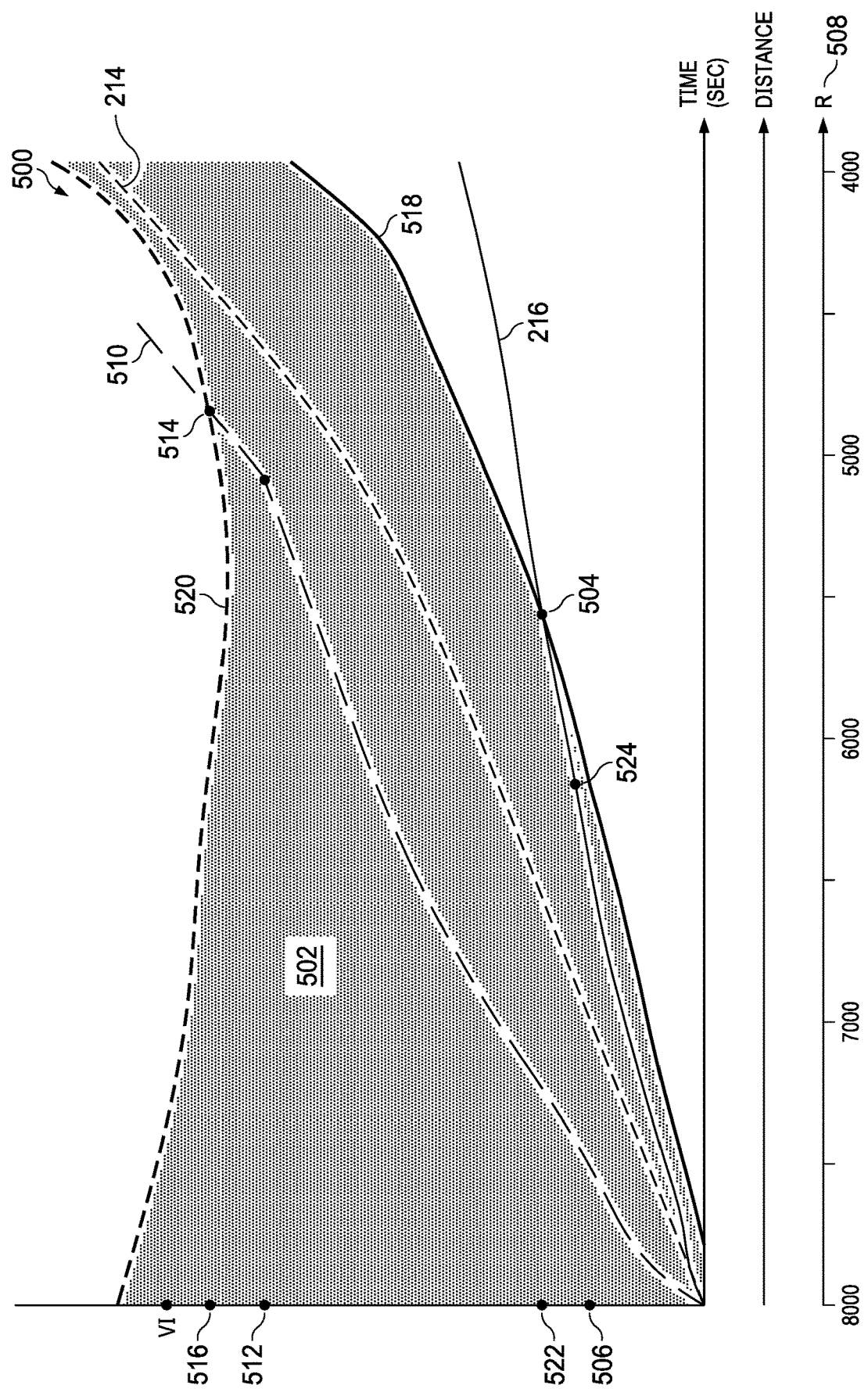
FIG. 5 is an illustration of a chart illustrating a constop boundary about a preexisting speed profile for an aircraft depicted in accordance with a non-limiting illustrative embodiment.

FIG. 5 illustrates an additional technical effect of ROTTOWIRE 314. More specifically, FIG. 5 is an illustration of a chart illustrating a constop boundary about a preexisting speed profile for an aircraft depicted in accordance with a non-limiting illustrative embodiment. Chart 500 repeats items introduced in FIG. 2, and adds constop boundary 502, and remaining distance 508 to departure end 106 information.

An additional technical effect shown by the embodiments illustrated herein is that because ROTTOWIRE 314 produces an actual speed profile for aircraft 104, ROTTOWIRE 314 is specially programmed to recognize, instantaneously and continuously, a variance of an actual speed profile from a preexisting speed profile.

Hence, as ROTTOWIRE 314 executes the operations discussed above, ROTTOWIRE 314 recognizes that when an actual current acceleration of aircraft 104 is less than an acceleration predicted by preexisting speed profile 318 then it may occur that an update to plot 216, by ROTTOWIRE 314 may provide an indication, at a given distance along horizontal axis 204, that a speed along the actual speed profile 320 plot 216, created during takeoff roll of aircraft 104 deviates enough from speeds along preexisting speed profile 318 of plot 214, such that aircraft 104 may not reach V1 speed with enough distance remaining on runway 102 to meet regulatory requirements. Preexisting speed profile 318 may be illustrated, without limitation, by plot 214, and actual speed profile 320 may be shown by plot 216, as shown without limitation, in FIG. 2. As noted above, plot 216 is continuously updated when any inputs into ROTTOWIRE 314 change.

Constop boundary 502 may include "STOP" boundary, line 518, on a lower side of plot 214, and "CONTINUE" boundary, line 520, on an upper side of plot 214. As a non-limiting example, if plot 214 represents a non-limiting preexisting speed profile 318, and plot 216 represents a non-limiting actual speed profile 320 for aircraft 104 that is not actually accelerating as predicted by preexisting performance database 326, then as ROTTOWIRE 314 recognizes that aircraft 104 will not reach the V1 speed with enough distance remaining on runway 102 to meet all regulatory requirements, ROTTOWIRE 314 is specially programmed to recognize that where plot 216 crosses through constop boundary 502, formed about plot 214, such as at intersection point 504, that at no speed greater than speed intersection velocity 522 at intersection point 504 on plot 216, will aircraft 104 be able to meet all regulatory performance requirements for takeoff on runway 102. Hence, when ROTTOWIRE 314 creates an intersection of an actual speed profile, such as, without limitation, plot 216 with constop boundary 502 at intersection point 504, then ROTTOWIRE 314 commands the takeoff of aircraft 104 to be stopped. In other words, plot 216 crossing line 518 of constop boundary 502 at intersection point 504 acts as a trip wire, for ROTTOWIRE 314 to command terminating the takeoff of aircraft 104.

One of ordinary skill in the art recognizes that aircraft 104 may not be accelerating as predicted by preexisting speed profile illustrated by plot 214 for numerous reasons. Without limitation, slow acceleration may be due to a reduced thrust or an increased drag for aircraft 104. Numerous conditions 120 may cause the reduced thrust or the increased drag for aircraft 104. Regardless of a cause of the reduced thrust or increased drag for aircraft 104, ROTTOWIRE 314 creates the actual speed profile for aircraft 104, as represented by plot 216 in FIG. 5. ROTTOWIRE 314 updates the actual speed profile for aircraft 104 continuously in real-time.

Actual speed profile projections beyond current speed are based in part on conditions 120 received by ROTTOWIRE 314. As a non-limiting example, if sensors 154 inform ROTTOWIRE 314 that engines are performing above engine failure levels, but below a performance level expected for plot 214 based upon preexisting performance data provided at least by performance database 326, then ROTTOWIRE 314 uses the reported reduction in thrust when creating actual speed profile projections beyond the current speed.

In the example shown by FIG. 5, ROTTOWIRE 314 may update plot 216 at and recognize then that a rightward extension of plot 216, of actual speed profile 320, from point 524 based upon current speed, of intersect recognition velocity 506 and current actual acceleration, intersects with constop boundary 502 at intersection point 504. Hence, ROTTOWIRE 314 will issue a "STOP" command and associated indications at intersect recognition velocity 506. Responsive to the "STOP" command from ROTTOWIRE 314, as described above, with ROTTOWIRE 314 in auto stop mode 322, autobrakes may be regulated to stop aircraft 104 within a preselected desired distance from departure end 106 of runway 102.

Alternatively, if ROTTOWIRE 314 updates the actual speed profile for aircraft 104 to plot 510 with a speed at intersect recognition velocity 512 and recognizes that plot 510 intersects constop boundary 502 line 520 at intersect point 514, then ROTTOWIRE 314 will recognize that aircraft 104 can accelerate enough to takeoff with an engine loss at intersect point 514, but at that point will be accelerating too fast to be able to meet all the requirements for stopping on the remaining runway if VEF occurred after intersect point 514. Hence, at speed intersect recognition velocity 512, ROTTOWIRE 314 would create a new runway extension speed 306, shown in FIG. 5 as a non-limiting example by intersection velocity 516, and the "CONTINUE" command when aircraft 104 reaches intersection velocity 516.

Further, constop boundary 502 may also incorporate ROTTOWIRE 314 evaluations of climb out performance for aircraft 104 after VEF on runway 102. Still, further technical effects may be produced by ROTTOWIRE 314 that provides benefits over takeoff performance limitations on current aircraft that lack ROTTOWIRE 314. In addition to accelerating and stopping on runway 102, performance requirements for aircraft 104 and regulations may also require specific climb performance, of an aircraft that had an engine fail at VEF, after taking off from a runway.

Climb performance requirements may intend to provide some specified clearance over terrain and objects that lay beyond departure end 106. Without limitation, FARs 25.111 and 25.119 present non-limiting examples of requirements for climb performance of aircraft 104 for a takeoff path that begins at the point where aircraft 104 is 35 feet above runway 102 and extends beyond departure end 106 until aircraft 104 is 1,500 feet above runway 102, or has completed a transition from a takeoff configuration to en route configuration—whichever is higher. These climb requirements currently may present a technical limitation of restricting a gross weight allowed for aircraft 104 on takeoff.

In addition to the benefits provided by ROTTOWIRE 314 by knowing the actual performance of aircraft 104, including an actual current location and a projected location of aircraft 104 remaining on runway 102 throughout a takeoff roll and lift off, as well as actual height 148 above departure end 106 that aircraft 104 will achieve, ROTTOWIRE 314 may also project and analyze climb performance beyond departure end 106. One of ordinary skill in the art will appreciate that using the exact location of aircraft 104 relative to departure end 106 of runway 102 when aircraft 104 reaches 35 feet above runway 102, for any takeoff weight less than a maximum weight that theoretically puts aircraft 104 right above departure end 106 at 35 feet above runway 102, provides an improvement over current takeoff performance systems based upon assumptions, margins, and expected performance that equals preexisting performance data.

The illustrated embodiments herein recognize and take into account that with ROTTOWIRE 314 receiving real time conditions 120 for aircraft 104, and knowing the actual performance of aircraft 104, after VEF, relative to runway 102 and the projected performance of aircraft 104 based upon actual real time performance of aircraft 104, that clearance over terrain and/or obstacles along a takeoff path may be accurately projected.

Hence just as with the takeoff roll, accurate real time analysis and projection by ROTTOWIRE 314 of aircraft 104 performance on climb out, may allow for a given runway 102 with set conditions 120, reducing a required thrust for takeoff and climb out, increasing a takeoff weight, or virtually providing a runway extension, by allowing aircraft 104 in conditions 120 to takeoff on a shorter runway than runway 102. Also, as with runway 102, limited weight and accelerate-stop performance improvements provided by ROTTOWIRE 314 at least as described above. A benefit of ROTTOWIRE 314 may be a reduction or elimination of required regulatory margins to climb out performance requirements for aircraft 104. Regulatory agencies may find that the accuracy of obstacle clearance analysis and takeoff performance provided by ROTTOWIRE 314 for aircraft 104 may eliminate the need for obstacle and terrain clearance margins provided by current regulations and methods.

Whereas current regulations, such as, without limitation, FAR 25.121 may require specified generic climb gradients until 1,500 feet above runway 102, or until aircraft 104 has completed a transition from a takeoff configuration to an en route configuration—whichever is higher, to provide clearance over terrain and obstacles on takeoff path for aircraft 104, ROTTOWIRE 314 is able to receive, from as a non-limiting example a terrain warning system of the aircraft and/or an flight management computer 328, actual elevation of all terrain and obstacles along the takeoff path and a planned climb out route for aircraft 104, and thus project, based on actual performance of aircraft 104, an actual clearance over each element of terrain or obstacle along the takeoff path.

Figure 6:
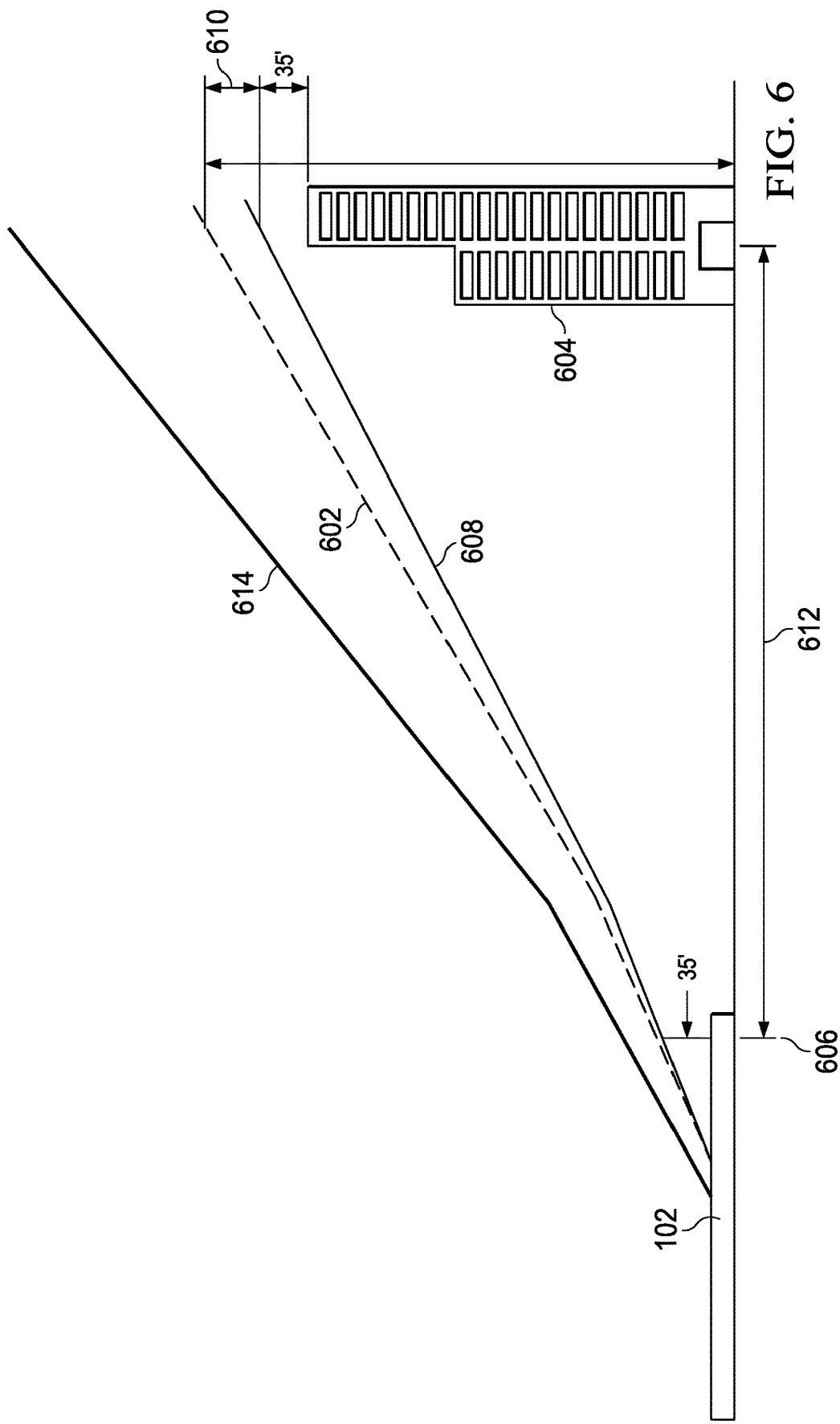
FIG. 6 is an illustration of a side view of a climb out after takeoff and an obstacle clearance profile for an aircraft depicted in accordance with an non-limiting illustrative embodiment.

FIG. 6 provides an illustration of how ROTTOWIRE 314 climb out analysis may affect constop boundary 502 and runway extension speed 306 indications and related alerts on takeoff roll for aircraft 104. FIG. 6 is an illustration of a side view of a climb out after takeoff and obstacle clearance profile for an aircraft depicted in accordance with a non-limiting illustrative embodiment. FIG. 6 is not drawn to scale, but merely for illustrative purposes. More specifically, FIG. 6 shows regulatory climb profile 602 required by regulation for aircraft 104, such that aircraft 104 is above obstacle 604 by at least 35 feet plus a distance of margin 610. Margin 610 indicates a distance, which per current FARs is 0.008 times distance 612. Distance 612 is the length from obstacle 604 to start 606 on runway 102. Start 606 represents a location where aircraft 104 was 35 feet above runway 102. If the actual current acceleration of aircraft 104 were less than plot 214 indicated in FIG. 5, such as, without limitation, as indicated by plot 216, such that ROTTOWIRE 314 can create a projection for aircraft 104 climb out to be represented by actual climb profile 608, then ROTTOWIRE 314 becomes aware that actual climb profile 608 will only clear obstacle 604 by 35 feet, and thus not meet the regulatory requirements.

Hence, constop boundary 502 of FIG. 5 may also be responsive to projections for actual climb out profiles and may reform constop boundary 502 relative to plot 214, such that when ROTTOWIRE 314 determines that the required clearance for aircraft 104 over obstacle 604 will not be met, constop boundary 502 may be reformed (not shown) relative to plot 214. As one non-limiting example, "STOP" boundary, line 518, may shift (not shown) and plot 216 may intersect "STOP" boundary, line 518, at a location other than intersection point 504 (not shown), such that runway extension speed 306 is removed from heads up display 302 and a "STOP" command is transmitted to aircraft 104 and/or the operator of aircraft 104, at some speed other than intersect recognition velocity 506.

Recognition of the advantages provided by ROTTOWIRE 314 may allow regulators to eliminate the current required margin of 0.008 times the distance from obstacle 604 to start 606 on runway 102, where aircraft 104 was 35 feet above runway 102.

Accordingly, for a takeoff from runway 102 at conditions 120, such a change would effectively allow at least one of a reduction of thrust required by aircraft 104 for takeoff on runway 102, and/or, an increase in takeoff weight of aircraft 104. Without ROTTOWIRE 314, each of those benefits would require a runway extension beyond the current length of runway 102. In contrast, with ROTTOWIRE 314, for conditions 120, a runway shorter than runway 102 may be used. Hence, virtually, ROTTOWIRE 314 provides a runway extension to aircraft 104 via creation and display of runway extension speed 306 and related alerts to an operator of aircraft 104.

Still further, one of ordinary skill in the art recognizes that when the actual current acceleration of aircraft 104 exceeds plot 214, then aircraft 104 will reach 35 feet above runway 102 further to the left of start 606 and may follow a climb out profile more like actual climb profile 614, which would put aircraft 104 well above a height required, as shown by regulatory climb profile 602. Such recognition by ROTTOWIRE 314 may reform constop boundary 502 about plot 214. Once again, for a takeoff from runway 102 at conditions 120, such a change would effectively allow at least one of a reduction of thrust required by aircraft 104 for takeoff on runway 102, and/or an increase in takeoff weight of aircraft 104. Without ROTTOWIRE 314, each of those takeoff enhancements would not be considered without an actual extension of a runway length used for takeoff that is beyond the current length of runway 102. In contrast, with ROTTOWIRE 314 for conditions 120, a runway shorter than runway 102 may be used. Hence, virtually, ROTTOWIRE 314 provides a runway extension to aircraft 104 via the creation and display of runway extension speed 306 and related alerts to an operator of aircraft 104.

As depicted, without limitation, aircraft 104 may also contain a special processor and/or a flight management computer (FMC), shown in FIG. 3, such as flight management computer 328. Flight management computer 328 may be a part of a flight management system. The flight management system may include flight management computer 328 along with and/or configured to communicate with other processors in aircraft 104.

Flight management computer 328 may be physically located within aircraft 104, or may be located outside of aircraft 104, but is in communication with aircraft 104 and systems on aircraft 104. Communication may be via a communication system and/or data link system. Depending upon a specific certification status for aircraft 104, flight management computer 328 may even be located outside of aircraft 104.

Flight management computer 328 may be a physical hardware system that includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

ROTTOWIRE 314 provides a machine and a process for sensing an actual current acceleration of aircraft 104 on a takeoff roll, and creating and displaying a runway extension speed (or Westphal-Shluze (WS) speed) to an operator that dynamically, in real time, denotes a required actual point for making a decision to act for a particular aircraft 104 on a particular runway 102 under a particular set of conditions 120.

ROTTOWIRE 314 may be implemented in software, hardware, firmware, or a combination thereof. When software is used, the operations performed by ROTTOWIRE 314 may be implemented in program code specially config-ured to run on hardware, such as a processor unit. When firmware is used, the operations performed by ROTTOWIRE 314 may be implemented in program code and data, and stored in persistent memory to run on a processor unit. When hardware is employed, the hardware may include circuits that operate to perform the operations in ROTTOWIRE 314.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable types of hardware devices.

As a result, when ROTTOWIRE 314 operates, which may be within or part of systems of flight management computer 328, ROTTOWIRE 314 and/or flight management computer 328 operates as a special purpose computer system in which ROTTOWIRE 314 enables continuously creating in real time runway extension speed 306. In particular, ROTTOWIRE 314 creates runway extension speed 306 by acting as a special purpose computer system as compared to currently available general computer systems that do not have specially coded programing configured in ROTTOWIRE 314.

As used herein, the terms "computer system," "comparator," "manager," "component," or "module" may include a hardware and/or software system that operates to perform one or more functions. For example, the comparator, manager, module, component, or system may include a computer processor, controller, or other logic-based device that performs operations based on instructions stored on a tangible and non-transitory computer-readable storage medium, such as a computer memory. Alternatively, the comparator, manager, module, component, or system may include a hard-wired device that performs operations based on hard-wired logic of the device. The flowcharts, modules, or components shown in the attached figures may represent the hardware that operates based on software instructions and hardware logic, the software that directs hardware to perform the operations, or a combination thereof.

Figure 7:
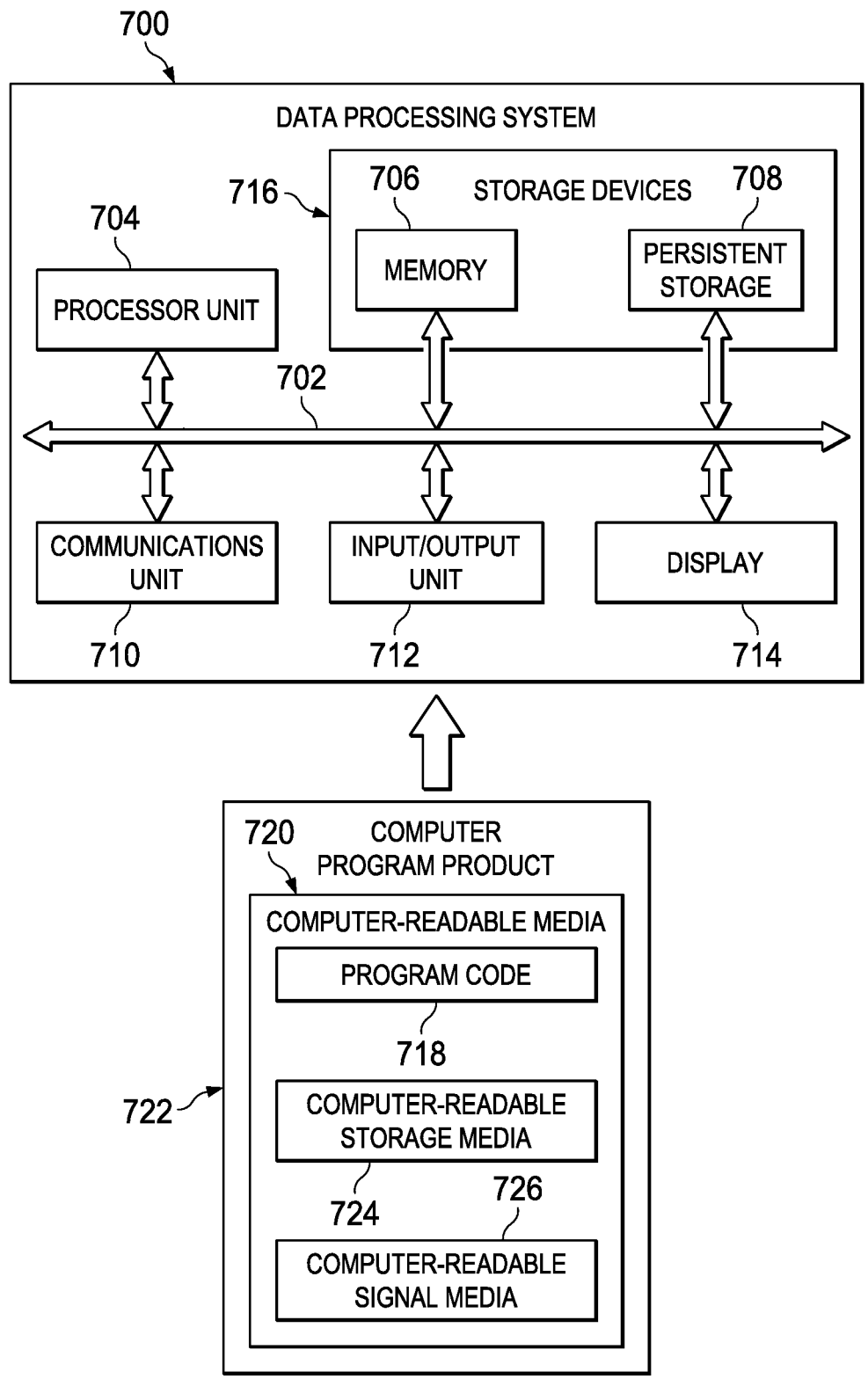
FIG. 7 is an illustration of a block diagram of a data processing system depicted in accordance with a non-limiting illustrative embodiment.

Turning now to FIG. 7, an illustration of a block diagram of a data processing system is depicted in accordance with a non-limiting illustrative embodiment. Data processing system 700 may be representative of implementations of computer systems used by ROTTOWIRE 314 shown in FIG. 3. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. In some illustrative examples, memory 706 may be persistent storage 708.

Persistent storage 708 may take various forms, depending on the particular implementation. For example, persistent storage 708 may contain one or more components or devices. For example, persistent storage 708 may be a hard drive, a solid state hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 may be or include a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components, in addition to or in place of those illustrated, for data processing system 700. Other components shown in FIG. 7 can be varied from the illustrative examples shown. The different embodiments may be implemented using any hardware device or system capable of running program code 718.

Figure 8:
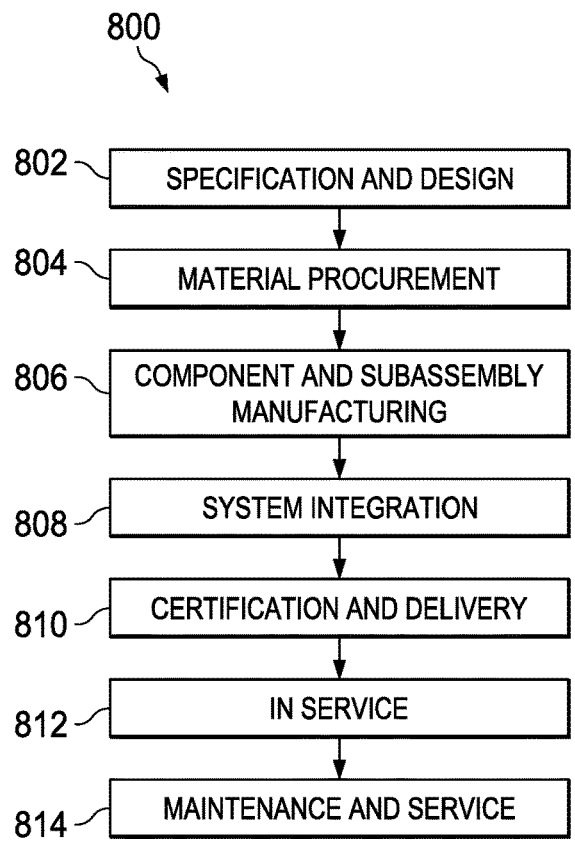
FIG. 8 is an illustration of a flowchart of a process for an aircraft manufacturing and service method depicted in accordance with a non-limiting illustrative embodiment.
Figure 9:
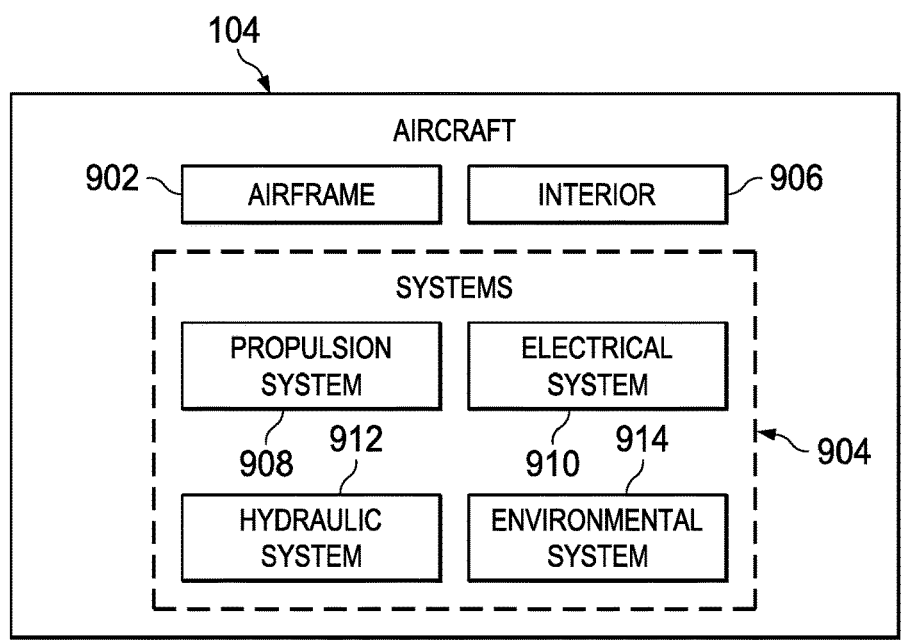
FIG. 9 is an illustration of a block diagram of an aircraft is depicted in which a non-limiting illustrative embodiment may be implemented.

The illustrative embodiments of the disclosure may be described in the context of aircraft manufacturing and service method 800 as shown in FIG. 8 and aircraft 104 as shown in FIG. 9. Turning first to FIG. 8, an illustration of a flowchart of a process for an aircraft manufacturing and service method is depicted in accordance with an illustrative embodiment. During preproduction, aircraft manufacturing and service method 800 may include specification and design 802 of aircraft 104 in FIG. 9 and material procurement 804.

During production, component and subassembly manufacturing 806 and system integration 808 of aircraft 104 in FIG. 9 takes place. Thereafter, aircraft 104 in FIG. 9 may go through certification and delivery 810 in order to be placed in service 812. While in service 812 by a customer, aircraft 104 in FIG. 9 is scheduled for routine maintenance and service 814, which may include modification, reconfiguration, refurbishment, or other maintenance and service.

Each of the processes of aircraft manufacturing and service method 800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of a block diagram of an aircraft is depicted in which a non-limiting illustrative embodiment may be implemented. In this example, aircraft 104 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included.

Apparatuses and methods embodied herein may be employed during at least one of the stages of aircraft manufacturing and service method 800 in FIG. 8. For example, ROTTOWIRE 314 in FIG. 3 may be incorporated into different configurations within aircraft 104 during specification and design 802 of aircraft 104, component and subassembly manufacturing 806, and system integration 808. As another example, ROTTOWIRE 314 may be integrated without limitation, into different configurations of at least one of flight management computer 328, a Flight Management System (FMS), an Electronic Flight Instrument System (EFIS), and/or components of an Airplane Information Management System (AIMS), on aircraft 104 during routine maintenance and service 814. For example, incorporations of ROTTOWIRE 314 integrated within aircraft 104 may be used to plan or implement work orders for modification, reconfiguration, refurbishment, or other maintenance and service for aircraft 104.

The use of a number of the different illustrative embodiments may substantially expedite the assembly of aircraft 104, reduce the cost of aircraft 104, or both expedite the assembly of aircraft 104 and reduce the cost of aircraft 104. The reduction in cost may be realized through reduced use of resources, such as by virtually extending runway lengths by improving takeoff payloads and/or reducing required thrust for aircraft 104 certified for flight using ROTTOWIRE 314, without any certification changes being required for equipment currently on and/or certified for aircraft 104.

Thus, described above are embodiments for a machine that includes a computer code specially programmed on a non-transitory medium to make a runway extension speed. The machine may be specially programmed and configured to sense a current location, an actual current acceleration, and a current speed, for an aircraft during a takeoff roll of the aircraft. The machine may be specially programmed and configured to create, in a ROTTOWIRE, a preexisting speed profile. The machine may be specially programmed and configured to create in the ROTTOWIRE a constop boundary about the preexisting speed profile. The machine may be specially programmed and configured to receive, in the ROTTOWIRE, the current speed and the actual current acceleration for the aircraft. The machine may be specially programmed and configured to create in the ROTTOWIRE an actual speed profile.

Further, the machine may be specially programmed and configured to derive, via a specially coded program in the ROTTOWIRE and the actual current acceleration, the runway extension speed based upon a determination for the current location of the aircraft, a distance from a departure end of the runway, a terminating distance for the aircraft, and a distance until the aircraft reaches a designated height after lifting off the runway, and a determination of when the terminating distance equals the distance from the departure end of the runway. Additionally, the machine may be specially programmed and configured to present the runway extension speed.

Still further, the machine may include the computer code specially programmed to recognize a configuration and a condition of a system on the aircraft, and create the preexisting speed profile and the actual speed profile based upon the configuration and the condition the system on the aircraft.

Figure 10:
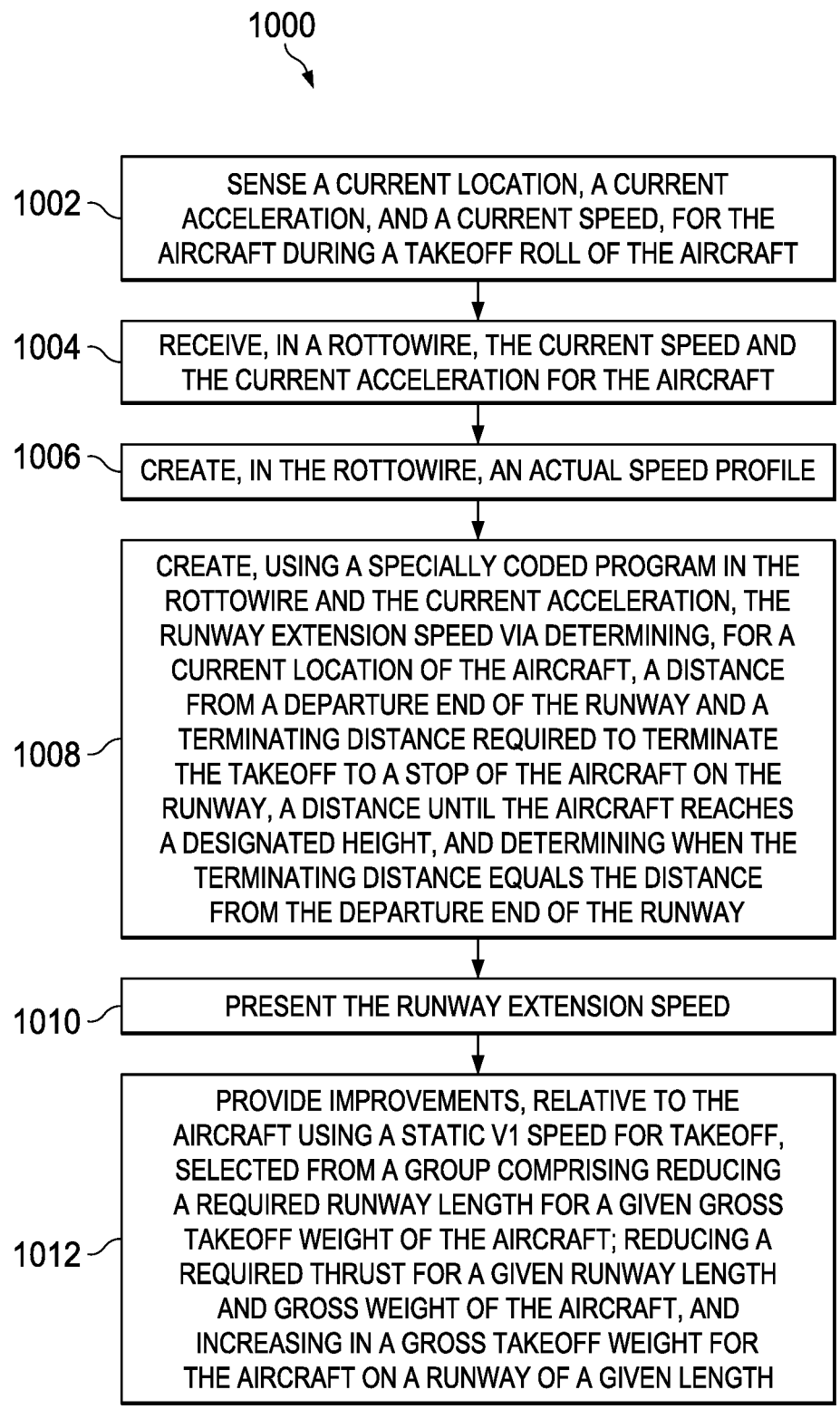
FIG. 10 is an illustration of a high-level flowchart for a process for creating a runway extension speed for an aircraft taking off on a runway depicted in accordance with a non-limiting illustrative embodiment.

Turning now to FIG. 10, an illustration of a high-level flowchart for a process for creating a runway extension speed for an aircraft taking off on a runway is depicted in accordance with a non-limiting illustrative embodiment. As shown, process 1000 includes sensing a current location, a current acceleration, and a current speed, for the aircraft during a takeoff roll of the aircraft (operation 1002). The sensing in operation 1002 may occur continuously. The current speed may be an airspeed and/or a ground speed. A ROTTOWIRE may process and convert between airspeed and ground speed, as necessary, for deriving an energy state for an aircraft and presenting information to an operator of the aircraft.

Process 1000 also includes receiving, in a ROTTOWIRE, the current speed and the current acceleration for the aircraft (operation 1004). Process 1000 creates, in the ROTTOWIRE, an actual speed profile (operation 1006). Process 1000 also includes creating, using a specially coded program in the ROTTOWIRE and the actual current acceleration, the runway extension speed via determining, for a current location of the aircraft, a distance from a departure end of the runway and a terminating distance required to terminate the takeoff to a stop of the aircraft on the runway, a distance until the aircraft reaches a designated height, and determining when the terminating distance equals the distance from the departure end of the runway (operation 1008). Process 1000 also includes creating the runway extension speed in operation 1008, which may occur continuously. Creating the runway extension speed may also include creating, in the ROTTOWIRE, a preexisting speed profile; creating, in the ROTTOWIRE, a constop boundary about the preexisting speed profile, and responsive to the actual speed profile moving toward a stop side of the constop boundary; and initiating a terminating sequence for the aircraft to a stop of the aircraft on the runway.

Further, the terminating sequence may also include presenting a stop command to an operator of the aircraft, and/or commanding aircraft systems to direct configurations causing a stop of the aircraft on the runway. Additionally, process 1000 may also include recognizing a configuration and a condition of a system on the aircraft, and creating the preexisting speed profile and the actual speed profile based upon the configuration and the condition the system on aircraft 104.

Process 1000 may also include presenting the runway extension speed (operation 1010). Process 1000 may also include providing improvements, relative to the aircraft using a static V1 speed for takeoff, selected from a group comprising: reducing a required runway length for a given gross takeoff weight of the aircraft; reducing a required thrust for a given runway length and gross weight of the aircraft; and increasing a gross takeoff weight for the aircraft on a runway of a given length (operation 1012).

Figure 11:
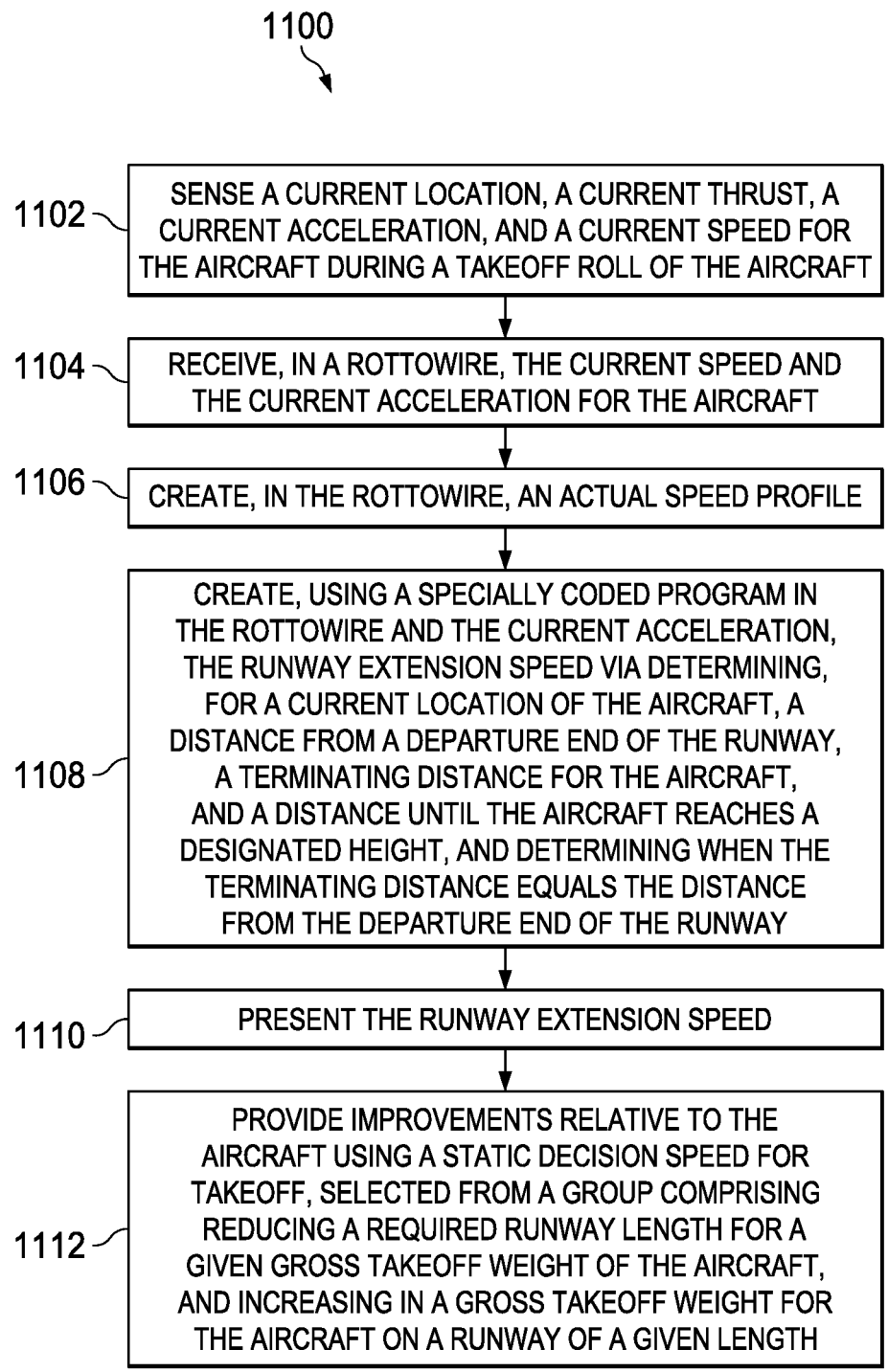
FIG. 11 is an illustration of a high-level flowchart for a process for reducing a thrust required for an aircraft, at a fixed gross weight, taking off on a runway depicted in accordance with a non-limiting illustrative embodiment.

Turning now to FIG. 11, an illustration of a high-level flowchart for a process for reducing a thrust required for an aircraft, at a fixed gross weight, taking off on a runway is depicted in accordance with a non-limiting illustrative embodiment. As shown, process 1100 shows a process for reducing a thrust required for an aircraft taking off on a runway at a fixed gross weight.

Process 1100 includes sensing a current location, a current thrust, a current acceleration, and a current speed for the aircraft during a takeoff roll of the aircraft (operation 1102). Process 1100 also includes receiving, in a ROTTOWIRE, the current speed and the current acceleration for the aircraft (operation 1104). Process 1100 also includes creating, in the ROTTOWIRE, an actual speed profile (operation 1106).

Further, process 1100 includes creating, using a specially coded program in the ROTTOWIRE and the current acceleration, the runway extension speed via determining, for a current location of the aircraft, a distance from a departure end of the runway, a terminating distance for the aircraft, and a distance until the aircraft reaches a designated height; and determining when the terminating distance equals the distance from the departure end of the runway (operation 1108). The ROTTOWIRE may create the runway extension speed continuously. The ROTTOWIRE may also create a preexisting speed profile. The ROTTOWIRE may also create a constop boundary about the preexisting speed profile. Further, responsive to the actual speed profile moving toward a stop side of the constop boundary, the ROTTOWIRE may initiate a terminating sequence. The terminating sequence may include a sequence for terminating the takeoff roll to a stop of the aircraft on the runway and present a stop command to an operator of the aircraft. The terminating sequence may include the ROTTOWIRE commanding aircraft systems to direct configurations causing a stop of the aircraft on the runway. Accordingly, the ROTTOWIRE may be configured with special programming for recognizing a configuration and a condition of a system on the aircraft, and creating the preexisting speed profile and the actual speed profile based upon the configuration and the condition the system on the aircraft.

Process 1100 may also include presenting the runway extension speed (operation 1110). Process 1100 also includes providing improvements, relative to the aircraft using a static decision speed for takeoff, selected from a group comprising reducing a required runway length for a given gross takeoff weight of the aircraft, and increasing in a gross takeoff weight for the aircraft on a runway of a given length (operation 1112).

The system, machine, and/or process shown herein may be applied to provide technical solutions for expanding a takeoff envelope and virtually extending a runway length for the aircraft, as compared to the aircraft operating without the ROTTOWIRE.

Figure 12:
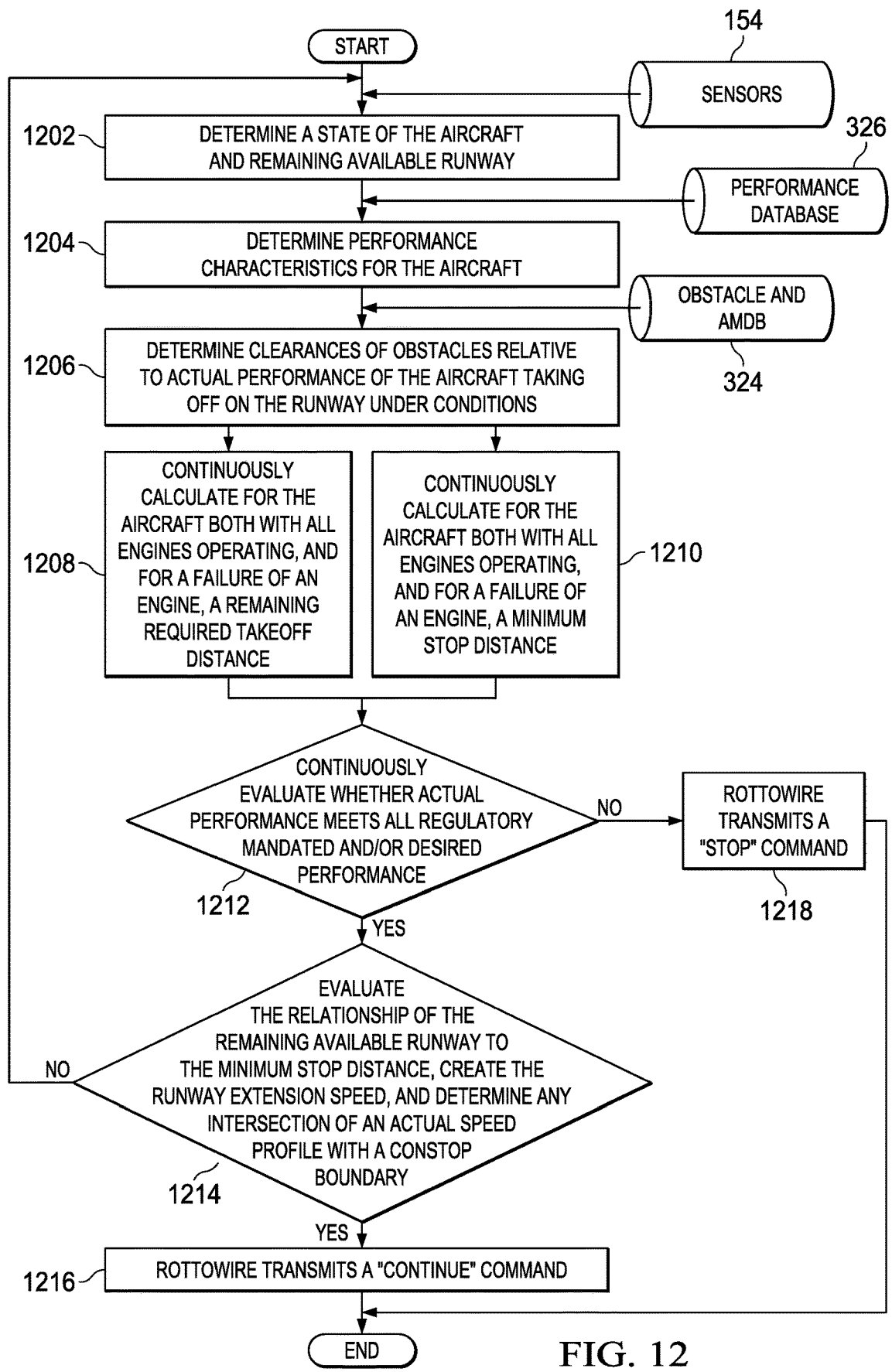
FIG. 12 is an illustration of a high-level flowchart of an example of logic that a ROTTOWIRE may use as part of creating a runway extension speed depicted in accordance with a non-limiting illustrative embodiment.

In further illustrative example, technical solutions are present that overcome a technical problem for accurately providing real-time guidance for making a decision for terminating or continuing a takeoff. In FIG. 12, an illustration of a high-level flowchart of an example of logic that a ROTTOWIRE may use as part of creating a runway extension speed is depicted in accordance with a non-limiting illustrative embodiment.

More specifically, the ROTTOWIRE may create a runway extension speed in part by utilizing logic shown as beginning with determining a state of the aircraft and remaining available runway (operation 1202). A state of the aircraft may include conditions of equipment of the aircraft as well as environmental conditions of the conditions affecting the aircraft and other information provided by sensors, such as, without limitation, a speed, a weight, and an altitude of the aircraft.

Additionally, the ROTTOWIRE determines performance characteristics for the aircraft (operation 1204). Performance characteristics may include preexisting performance predictions based upon "book values" in a performance database, and/or actual performance data based upon information provided by the sensors. The ROTTOWIRE may also determine clearances of obstacles relative to actual performance of the aircraft taking off on the runway under the conditions (operation 1206). Information regarding locations, heights, and sizes of obstacles may be accessed by the ROTTOWIRE from data in a navigation system and/or a terrain warning system and/or in an airport map database.

The ROTTOWIRE may continuously calculate for the aircraft both with all engines operating, and for a failure of an engine, a remaining required takeoff distance (operation 1208), and a minimum stop distance (operation 1210). A minimum stop distance with the ROTTOWIRE may be represented as distance 112 plus distance 118 in FIG. 1 resulting from a maximum effort stop. With the ROTTOWIRE in an auto stop mode, the minimum stop distance may be represented by distance 118 in FIG. 1, at least because distance 112 may be reduced to zero by the auto stop mode. Required takeoff distance may be a distance in which the aircraft meets all regulatory mandated and/or desired performance. Desired performance may be levels of performance input into the ROTTOWIRE by a manufacturer, an owner, or an operator. Levels of performance may specify particular obstacle clearance heights and/or runway margin lengths desired for specified conditions for takeoff.

The ROTTOWIRE will continuously evaluate whether actual performance meets all regulatory mandated and/or desired performance (operation 1212). If actual performance meets all regulatory mandated and/or desired performance, then the process continues on to evaluate the relationship of the remaining available runway to the minimum stop distance, create of a runway extension speed, and determine any intersection of an actual speed profile with a constop boundary (operation 1214). A non-limiting example of an intersection of actual speed profile of plot 216 with constop boundary 502 is shown at intersection point 504 in FIG. 5

If the remaining available runway is greater than minimum stop distance, then the process reverts back to operation conditions acceleration profile. When remaining available runway equals minimum stop distance, the ROTTOWIRE transmits a "CONTINUE" command (operation 1216). The logic would then conclude. Alternatively, looking back to operation 1212, when the ROTTOWIRE creates the intersection point of the actual speed profile and the constop boundary, the ROTTOWIRE determines that actual performance does not meet all all regulatory mandated and/or desired performance, and transmits a "STOP" command, (operation 1218). The logic then concludes The "STOP" command may be to an operator of the aircraft, and/or, such as when the auto stop mode of the ROTTOWIRE is active, to the equipment on the aircraft. Hence, the process may continuously operate at least until the aircraft lifts off the runway or an engine failure occurs, and ROTTOWIRE transmits a command.

The ROTTOWIRE may possess other logic flows, such as, without limitation, for evaluating height above the runway and/or other terrain and/or obstacles on a takeoff path of the aircraft. The ROTTOWIRE may run numerous logics simultaneously, and respond to commands as they are issued.

Hence, the illustrative examples show that one or more technical solutions are present that overcome a technical problem with takeoff performance, whereby a decision on a takeoff roll for the aircraft to continue the takeoff, or initiate a terminating sequence on the runway, may be based, in real time, on more than just an engine failure event, but on a totality of the conditions and the equipment that affect an ability of the aircraft to accelerate and/or stop within desired performance parameters.

The descriptions and illustrations of ROTTOWIRE 314 and the different components in FIGS. 1-12 are not meant to imply physical or architectural limitations to the manner in which an illustrative embodiment may be implemented. Other components, in addition to or in place of the ones illustrated, may be used. In some embodiments, some described components may be considered unnecessary and not included.

Further, the blocks are presented to illustrate some functional components. One or more of these blocks may be combined, divided, or combined and divided into different blocks when implemented in an illustrative embodiment.

The flowcharts and diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware.

When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The illustrative embodiments provide one or more technical solutions to technical problems with takeoff performance assessment and decisions to terminate a takeoff after an engine failure, using only V1 speed. Additionally, one of ordinary skill in the art recognizes that although current regulations require takeoff performance evaluation in response to an failure of a critical engine, ROTTOWIRE 314 enables accurate real time adjustments to indications for making a decision to continue or terminate a takeoff, based not only upon failure of an engine, but upon real time changes in any conditions 120 sent to ROTTOWIRE 314 that might affect an ability of aircraft 104 to accelerate during and/or climb out after takeoff.

ROTTOWIRE 314 and processes incorporating the use thereof offer several technical advantages provide at least improved takeoff performance and a reduction in resources needed to virtually extend runway lengths via allowing increased takeoff payloads and/or reduced thrust on takeoff. These technical advantages may include, for example, allowing an operator of aircraft 104 to receive a dynamic indication, based upon actual current acceleration and condition and location of aircraft 104, of a speed by which a decision to terminate a takeoff must be made. Applicant is not aware of any current machine or process that enables this technical advantage.

This technical advantage allows savings that will eliminate costs of time, man hours, aircraft down time, resources, materials, and equipment, required by current systems that limit takeoff performance. By providing a machine and process that creates new coding for dynamically assessing takeoff performance, ROTTOWIRE 314 adds takeoff performance capability to aircraft 104. Further, no review or recertification for any of the equipment and/or instruments currently installed on the aircraft should be required when ROTTOWIRE 314 is operational.

Additionally, ROTTOWIRE 314 may reduce the cost and time for design and manufacturing, as well as potential for reduced infrastructure costs associated with producing aircraft certified for flight with increased takeoff payloads or reduced takeoff thrust and/or runway length. Hence, large groups of aircraft may be produced and/or converted for customers using ROTTOWIRE 314 at least as shown in embodiments presented and described for the figures above. Further, manufacturers may be able to more efficiently produce aircraft by incorporating the technical advantages provided by ROTTOWIRE 314.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the components may have a configuration or design for a structure that provides the component an ability to perform the action or operation that is described in the illustrative examples as being performed by the components.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A process for creating a runway extension speed for an aircraft taking off on a runway, the process comprising:
    sensing a current location, a current acceleration, and a current speed, for the aircraft during a takeoff roll of the aircraft;
    receiving, in a specially programmed processor, the current speed and the current acceleration for the aircraft;
    creating, in the specially programmed processor, an actual speed profile;
    creating, in the specially programmed processor, and using the actual speed profile, the runway extension speed via determining, for the current location of the aircraft:
        a distance from a departure end of the runway; and
        a terminating distance required to terminate a takeoff to a stop of the aircraft on the runway; and
    presenting the runway extension speed.

2. The process of claim 1, further comprising continuously sensing the current location, the current acceleration, and the current speed, for the aircraft during the takeoff roll of the aircraft.

3. The process of claim 1, further comprising continuously creating, using the current acceleration, the runway extension speed.

4. The process of claim 1, further comprising an auto stop mode in the specially programmed processor, responsive to particular conditions, automatically terminating the takeoff and stopping the aircraft.

5. The process of claim 1, further comprising:
    the current speed comprising an airspeed of the aircraft; and determining, for the current location of the aircraft:
        a distance required for the aircraft to reach a designated height; and
        when the terminating distance equals the distance from the departure end of the runway.

6. The process of claim 1, further comprising the current speed comprising a ground speed of the aircraft.

7. The process of claim 1, further comprising the specially programmed processor providing improvements, relative to the aircraft using a static V1 speed for the takeoff, selected from a group comprising reducing a required runway length for a given gross takeoff weight of the aircraft; reducing a required thrust for a given runway length and gross weight of the aircraft; and increasing in a gross takeoff weight for the aircraft on a runway of a given length.

8. The process of claim 1, further comprising:
    creating in the specially programmed processor a preexisting speed profile;

creating in the specially programmed processor a constop boundary about the preexisting speed profile; and responsive to the actual speed profile moving toward a stop side of the constop boundary, initiating a terminating sequence.

9. The process of claim 8, further comprising the terminating sequence comprising a sequence for terminating the takeoff roll to the stop of the aircraft on the runway.

10. The process of claim 8, further comprising the terminating sequence comprising presenting a stop command to an aircraft operator.

11. The process of claim 8, further comprising the terminating sequence comprising commanding aircraft systems to direct configurations causing the stop of the aircraft on the runway.

12. The process of claim 8, further comprising the specially programmed processor:
recognizing a configuration and a condition of a system on the aircraft; and
creating the preexisting speed profile and the actual speed profile based upon the configuration and the condition of the system on the aircraft.

13. A process for reducing a thrust required for an aircraft, at a fixed gross weight, taking off on a runway the process comprising:
reducing, from a thrust required using a fixed action speed based upon a preexisting speed profile for a takeoff, the thrust required for the aircraft via using a specially programmed processor producing a runway extension speed;
sensing a current location, a current thrust, a current acceleration, and a current speed, for the aircraft during a takeoff roll of the aircraft;
receiving, in the specially programmed processor, the current speed and the current acceleration for the aircraft;
creating, in the specially programmed processor, an actual speed profile;
creating, in the specially programmed processor using the actual speed profile, the runway extension speed via determining, for the current location of the aircraft:
a distance from a departure end of the runway; and
a terminating distance for the aircraft; and
presenting the runway extension speed.

14. The process of claim 13, further comprising:
continuously creating, using the current acceleration, the runway extension speed.

15. The process of claim 13, further comprising an auto stop mode in the specially programmed processor, responsive to particular conditions, automatically terminating the takeoff and stopping the aircraft.

16. The process of claim 13, further comprising the specially programmed processor providing improvements, relative to the aircraft using a static V1 speed for the takeoff, selected from a group comprising reducing a required runway length for a given gross takeoff weight of the aircraft, and increasing a gross takeoff weight for the aircraft on a runway of a given length.

17. The process of claim 13, further comprising the specially programmed processor:
recognizing a configuration and a condition of a system on the aircraft;
creating the preexisting speed profile and the actual speed profile based upon the configuration and the condition the system on the aircraft; and
determining, for the current location of the aircraft:
a distance required for the aircraft reaches to reach a designated height; and
when the terminating distance equals the distance from the departure end of the runway.

18. The process of claim 13, further comprising:
creating in the specially programmed processor the preexisting speed profile;
creating in the specially programmed processor a constop boundary about the preexisting speed profile; and
responsive to the actual speed profile moving toward a stop side of the constop boundary, initiating a terminating sequence.

19. The process of claim 18, further comprising:
the terminating sequence comprising a sequence for terminating the takeoff roll to a stop of the aircraft on the runway; and
presenting a stop command to an aircraft operator.

20. The process of claim 18, further comprising the terminating sequence comprising commanding aircraft systems to direct configurations causing a stop of the aircraft on the runway.

21. A machine that comprises a computer code specially programmed on a non-transitory medium to make a runway extension speed, the machine configured to:
sense a current location, a current acceleration, and a current speed, for an aircraft during a takeoff roll of the aircraft;
create, in a specially programmed processor, a preexisting speed profile;
create, in the specially programmed processor, a constop boundary about the preexisting speed profile;
receive, in the specially programmed processor, the current speed and the current acceleration for the aircraft;
create, in the specially programmed processor, an actual speed profile;
create, in the specially programmed processor, the runway extension speed based upon:
the actual speed profile;
a determination for the current location of the aircraft;
a distance from a departure end of a runway; and
a terminating distance for the aircraft; and
present the runway extension speed.

22. The machine of claim 21, further comprising the computer code specially programmed to:
recognize a configuration and a condition of a system on the aircraft;
create the preexisting speed profile and the actual speed profile based upon the configuration and the condition of the system on the aircraft;
determine a distance required for the aircraft to reach a designated height after lifting off the runway; and
determine when the terminating distance equals the distance from the departure end of the runway.

23. The machine of claim 21, further comprising the specially programmed processor comprising an auto stop mode configured, responsive to particular conditions, to automatically terminate a takeoff and stop the aircraft.

* * * * *